United States Patent
Smith et al.

(10) Patent No.: US 10,944,296 B2
(45) Date of Patent: Mar. 9, 2021

(54) RECEIVER DEVICE FOR FACILITATING WIRELESS POWER RECEPTION

(71) Applicant: Voice Life Inc., Huntington Beach, CA (US)

(72) Inventors: Robert Smith, Huntington Beach, CA (US); David Lee Lark, Corcoran, CA (US); Michael Hunter Smith, Huntington Beach, CA (US)

(73) Assignee: VOICE LIFE INC., Huntington Beach, CA (US)

( * ) Notice: Subject to any disclaimer, the term of this patent is extended or adjusted under 35 U.S.C. 154(b) by 0 days.

(21) Appl. No.: 16/597,776

(22) Filed: Oct. 9, 2019

(65) Prior Publication Data

US 2020/0044485 A1    Feb. 6, 2020

Related U.S. Application Data

(63) Continuation-in-part of application No. PCT/IB2018/057826, filed on Oct. 9, 2018.

(60) Provisional application No. 62/569,722, filed on Oct. 9, 2017.

(51) Int. Cl.
| | |
|---|---|
| *H02J 50/80* | (2016.01) |
| *H02J 50/20* | (2016.01) |
| *H02J 50/40* | (2016.01) |
| *H04W 12/00* | (2021.01) |
| *G10L 15/22* | (2006.01) |
| *H04L 9/06* | (2006.01) |
| *H04W 12/06* | (2021.01) |

(52) U.S. Cl.
CPC .............. *H02J 50/20* (2016.02); *H02J 50/40* (2016.02); *H02J 50/80* (2016.02); *G10L 15/22* (2013.01); *G10L 2015/223* (2013.01); *H04L 9/0637* (2013.01); *H04L 2209/38* (2013.01); *H04W 12/00506* (2019.01); *H04W 12/06* (2013.01)

(58) Field of Classification Search
CPC ............................................... B60L 53/12–126
See application file for complete search history.

(56) References Cited

U.S. PATENT DOCUMENTS

| | | | |
|---|---|---|---|
| 10,103,552 B1* | 10/2018 | Leabman | H02J 50/20 |
| 2008/0079396 A1* | 4/2008 | Yamazaki | H01M 10/44 |
| | | | 320/128 |
| 2010/0013319 A1* | 1/2010 | Kamiyama | H02J 50/10 |
| | | | 307/104 |

(Continued)

*Primary Examiner* — Rexford N Barnie
*Assistant Examiner* — David A Shiao

(57) ABSTRACT

Disclosed is a receiver device for facilitating wireless power reception, the receiver device comprising a receiver transceiver configured for wirelessly communicating with at least one transmitter device. Further, the receiver device comprising of a receiver processing device communicatively coupled to the unique receiver transceiver. Further, the receiver device comprising a enabled receiver storage device configured for storing energy for at least one blockchain enabled receiver. Moreover, the receiver device comprising a unique power port communicatively coupled with the unique receiver transceiver, wherein the unique power output port is configured to be interfaced with at least one power input port of at least one electronic device, wherein the unique power output port is configured for supplying the electrical energy to the at least one electronic device.

18 Claims, 24 Drawing Sheets

(56) References Cited

U.S. PATENT DOCUMENTS

| | | | |
|---|---|---|---|
| 2010/0013320 A1* | 1/2010 | Shiozaki | H02J 50/60 307/104 |
| 2010/0099356 A1* | 4/2010 | Forrest | H04B 5/02 455/41.2 |
| 2014/0361728 A1 | 12/2014 | Qian et al. | |
| 2014/0375139 A1* | 12/2014 | Tsukamoto | H02J 50/12 307/104 |
| 2015/0244204 A1 | 8/2015 | Lee et al. | |
| 2016/0020649 A1 | 1/2016 | Bell et al. | |
| 2016/0033254 A1* | 2/2016 | Zeine | G01S 11/00 307/104 |
| 2016/0087691 A1 | 3/2016 | Van Wageningen et al. | |
| 2016/0261145 A1* | 9/2016 | Kinoshita | H02J 50/80 |
| 2016/0268833 A1* | 9/2016 | Lee | H02J 50/80 |
| 2016/0276841 A1* | 9/2016 | Tachiwa | H02J 50/90 |
| 2017/0110910 A1 | 4/2017 | Zeine et al. | |
| 2018/0272886 A1* | 9/2018 | Stocker | B60L 53/665 |
| 2019/0305594 A1* | 10/2019 | Tachiwa | H04M 1/7253 |
| 2020/0244109 A1* | 7/2020 | Song | H01Q 1/32 |

* cited by examiner

RECEIVER DEVICE FOR FACILITATING WIRELESS POWER RECEPTION

FIELD OF THE INVENTION

The present disclosure relates to the field of wireless charging and, in particular, to devices for wireless power transmission and reception.

BACKGROUND OF THE INVENTION

Radio-frequency (RF)-based wireless technology enables three different basic system functions, namely, wireless communication (data/voice), wireless sensing (parameter), and wireless powering transmission (energy). The first two well-known wireless applications are found today in numerous social and economic activities, which have been transforming our daily life. However, the terahertz wireless power transmission (WPT), which is unknown at least publicly, has not yet been developed and established as one of the fundamental driving forces for wireless powering (charging) of mobile devices.

Further, portable electronic devices such as smartphones, tablets, notebooks, and other electronic devices have become an everyday need in the way we communicate and interact with others. The frequent use of these devices needs a significant amount of power, which may easily deplete the batteries attached to these devices. Therefore, a user is frequently needed to plug in the device to a power source and recharge such devices. This may require having to charge electronic equipment at least once a day, or in high-demand electronic devices more than once a day.

Such an activity may be tedious and may represent a burden to users. For example, a user may be required to carry chargers in case his electronic equipment is lacking power. In addition, users have to find available power sources to connect to. Lastly, users must plugin to a wall or other power supplies to be able to charge electronic devices. However, such an activity may render electronic devices inoperable during charging.

Current solutions may include TOT low power sensors, and smartphones, tablets and other electronic devices using rechargeable batteries. However, the aforementioned approach requires a user to carry around extra batteries, and also make sure that the extra set of batteries is charged. Solar-powered battery chargers are also known, however, solar cells are expensive, and a large array of solar cells may be required to charge a battery of any significant capacity. Other approaches involve a mat or pad that allows charging of a device without physically connecting a plug of the device to an electrical outlet, by using electromagnetic signals. For example, harvesting (RF) energy typically utilizes directional antennas to target and deliver energy to a device and utilizes a directional pocket of energy and waveform operating in the 2.4/5.8 GHz radio frequency range. In this case, the device still requires to be placed in a certain location, and orientation for a period of time in order to be charged. Assuming a single source power transmission of electromagnetic (EM) signal, a factor proportional to $1/r^2$ reduces an EM signal power over a distance r; in other words, it is attenuated proportionally to the square of the distance. Thus, the received power at a large distance from the EM transmitter is a small fraction of the power transmitted. To increase the power of the received signal, the transmission power would have to be boosted. Assuming that the transmitted signal has an efficient reception at three centimeters from the EM transmitter, receiving the same signal power over a useful distance of three meters would entail boosting the transmitted power by 10,000 times. Such power transmission is wasteful, as most of the energy would be transmitted and not received by the intended devices, it could be hazardous to living tissue, it would most likely interfere with most electronic devices in the immediate vicinity, and it may be dissipated as heat. In yet another approach such as directional power transmission, it would generally require knowing the location of the device to be able to point the signal in the right direction to enhance the power transmission efficiency. However, even when the device is located, efficient transmission is not guaranteed due to reflections and interference of objects in the path or vicinity of the receiving devices. In addition, in many use cases, the device is not stationary, which is an added difficulty.

In addition, in currently available wireless charging solutions, there is inadequate security associated with power transfer. In particular, there are no mechanisms in place to ensure that power transfer is provided only to authorized devices.

Further, existing wireless chargers are designed to charge specific electronic devices that are generally co-designed with corresponding wireless chargers. In other words, both the wireless transmitter and a wireless receiver are designed as a pair to be matched in terms of parameters of power transfer. Accordingly, the wireless transmitter of existing wireless chargers is not capable of supplying power to multiple electronic devices with varying parameters. Furthermore, the wireless receiver is required to be placed at a specified distance in order to provide efficient and/or timely charging. In other words, any deviation in the distance between the wireless transmitter and the wireless receiver may result in inefficiencies and/or insufficient transfer of power.

Additionally, in existing wireless charging networks and systems, there is no monitoring of the wireless power transfer process. In other words, a user is largely unaware of the operational status of the power transfer process. The only way that a user may realize that power transfer is taking place is by noticing a change in a level of a battery of a receiver device. Furthermore, this requires a user's presence near the wireless charger and/or receiver in order to monitor and ensure the proper transfer of power.

Finally, in existing wireless charging solutions, there is inadequate security and authentication associated with power transfer. In particular, there are no mechanisms in place to ensure that power transfer is provided only to authorized and authenticated devices.

Further, there is an increasing interest in blockchain technology and the Internet-of-Things (IoT) where small computing sensors and mobile devices are embedded in everyday objects and environments. However, providing power to such small computing sensors and mobile devices is a challenge, as these sensors and computing devices become smaller and more numerous. Directly plugging these devices to provide power is inconvenient and is difficult at large scale.

Low-Power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs. For example, an LLN may be an Internet of Things (IoT) network in which "things," e.g., uniquely identifiable objects such as sensors and actuators, are interconnected over a computer network.

In IoT and similar networks, mobile nodes may register with different local networks as they move. For example, a person may carry a number of wearable sensors (e.g., heart rate monitor, blood glucose meter, etc.) that connect to different networks as the user travels (e.g., through a community, between different floors of a building, etc.). Each of these sensors and the various networks may have their own registration and authentication mechanisms that can consume multiple resource cycles, depending on how fast the objects are moving.

Therefore, there is a need for improved methods and system for wirelessly charging electronic devices that may overcome one or more of the abovementioned problems and/or limitations.

SUMMARY

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a receiver device for facilitating wireless power reception is disclosed. The receiver device may include a receiver transceiver configured for wirelessly communicating with at least one transmitter device. Further, the receiver transceiver may be configured for receiving at least one transmitter characteristic data from the at least one transmitter device. Further, the receiver transceiver may be configured for transmitting at least one receiver characteristic data to the at least one transmitter device. Further, the at least one transmitter device may be configured for controlling transmission of wireless power based on the at least one receiver characteristic data. Further, the receiver transceiver may be configured for receiving wireless power transmission from the at least one transmitter device. Further, the receiver transceiver may be configured for converting the wireless power transmission into electrical energy. Further, the receiver device may include a receiver processing device communicatively coupled to the receiver transceiver. Further, the receiver processing device may be configured for analyzing the at least one transmitter characteristic data. Further, the receiver processing device may be configured for determining capability of the at least one transmitter device for transmitting wireless power receivable by the receiver device based on the analyzing. Further, the receiver device may include a receiver storage device configured for storing the at least one receiver characteristic data. Further, the receiver device may include a power output port communicatively coupled with the receiver transceiver. Further, the power output port may be configured to be interfaced with at least one power input port of at least one electronic device. Further, the power output port may be configured for supplying the electrical energy to the at least one electronic device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
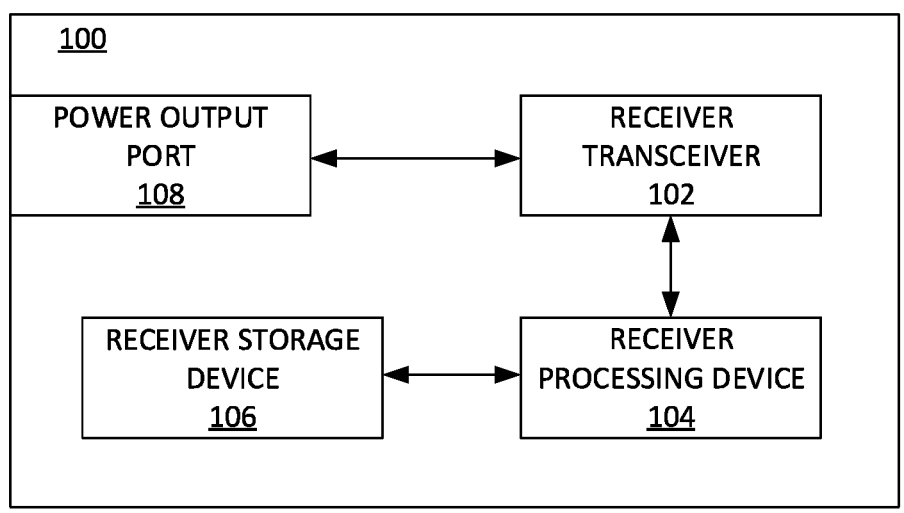
FIG. 1 is a block diagram of a receiver device for facilitating wireless power reception in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of wireless charging of electronic devices, embodiments of the present disclosure are not limited to use only in this context.

Overview

The present disclosure provides wireless power network (WPN) applications and mechanisms. In particular, the present disclosure provides terahertz wireless power transmission for (charging) receiver devices utilizing a terahertz power transmission wave. It should be understood that applications and mechanism of the disclosed techniques are not limited to the foregoing examples. Accordingly, all improvements and transformations shall fall within the protection scope of the present disclosure.

Terahertz wave—also known as sub-millimeter radiation, terahertz radiation, tremendously high frequency, T-rays, T-waves, T-light, T-lux or THz—consists of electromagnetic waves within the ITU-designated band of frequencies from 0.3 to 3 terahertz (THz; 1 THz=$10^{12}$ Hz).

Accordingly, in some embodiments, Terahertz wireless power-based methods and systems for power transmission are provided. Terahertz wireless power-based methods and systems for power transmission may implement rapid transmission of power (charging) between many receiver devices. Additionally, the methods and systems may implement a novel Artificial Intelligence (AI) interactive algorithm model in the terahertz transmitter device and/or receiver devices. Accordingly, power transmission and data interaction may be performed quickly, stably and securely.

The methods and systems may implement optimization on a physical structure of a Wireless Power Network (WPN) product based on wireless power transmission, thus may allow completion of transmission and exchange of power and in a scenario in which a power transmission medium is highly secured. The methods and systems may provide bulk transmission of power, which may be managed through the WPN which employs the use of artificial intelligence and deep learning that is scalable and can be accessed everywhere.

A terahertz wireless power-based method for power transmission may include placing a terahertz receiver device within a terahertz wireless signal search range of a terahertz transmitter device. Further, the terahertz transmitter device and the terahertz receiver device may be configured to mutually detect whether a function of transmitting and receiving power through a terahertz wireless signal is available in each other. If both the terahertz transmitter device and the terahertz receiver device detect mutually availability of the function of transmitting and receiving power through a terahertz wireless signal, connection and a unique match (i.e. pairing) may be performed between the terahertz transmitter device and the terahertz receiver device. When a connection and paring are successful, the terahertz transmitter device may send power to the terahertz receiver device through a terahertz wireless signal. Further, in some embodiments, the initiation of power transfer may be based on a voice user interface instruction (e.g. a voice command provided a user).

In another embodiment, a terahertz wireless power-based method for power transmission may include placing a portable terahertz transmitter device within a terahertz wireless signal search range of a terahertz receiver device and performing connection and unique match between the terahertz transmitter and terahertz receiver device. When connection and paring are successful, the terahertz transmitter device may send power and data to the terahertz receiver device.

In a further embodiment, a terahertz wireless power-based system for power transmission may include a terahertz transmitter device connected and paired to many other terahertz receiver devices, and sending power to the many other terahertz receiver devices via a terahertz wireless signal according to a user instruction. The system located on the wireless power network (WPN) may further include many other terahertz receiver devices for receiving the power sent by the terahertz transmitter device via the terahertz wireless power signal.

Terahertz wireless power-based methods and systems for power transmission are provided. To make the objectives, technical solutions and advantages clear, the methods and systems are described in detail with reference to the accompanying drawings. It should be understood that the specific embodiments described herein are for illustrative purposes and are not intended to limit the claimed invention in any way.

Terahertz wireless power-based methods and systems for power transmission may include a terahertz transmitter device and a terahertz receiver device placed within an effective distance of each other and, by means of connection and unique match, the terahertz transmitter device receives communications data from the terahertz receiver device and after receiving the communication data, the terahertz transmitter device can transmit power to the terahertz receiver device via a terahertz wireless power signal.

According to some embodiments, the present disclosure provides a terahertz wireless power-based method for power transmission. Accordingly, when power transmission is required, the method may include placing a terahertz receiver device within a terahertz wireless signal search range of a terahertz transmitter device and performing connection and unique match between the terahertz transmitter device and the terahertz receiver device.

A terahertz transmitter device and a terahertz receiver device together may support terahertz wireless power transmission. A terahertz transmitter device and a terahertz receiver device may be respectively referred to as a first node and a second node. High-speed power and data transmission may be performed between the two nodes. Power transmission is unilateral and any data communication may be bilateral. A terahertz transmitter device may transmit communication data to a terahertz receiver device. A terahertz receiver device may transmit communication data to a terahertz transmitter device. Data is structured providing registration process that identifies the type of device, calculates the distance from the transmitter to the receiver and detect how much of a battery charge the mobile receiver device needs.

A terahertz receiver device can consist of Internet of Things (IoT) devices, mobile electronic devices, Smartphones, Wearables, Tablets, Gaming consoles and controllers, e-book readers, Remote controls, Sensors (in automobiles or such as thermostats), autonomous vehicles, Toys Rechargeable batteries, Rechargeable lights, Automotive accessories and Medical devices etc. A terahertz receiver device may receive power (charge) from a terahertz transmitter device. A terahertz transmitter device is located in the in the wireless power network (WPN) in the cloud may be connected to a graphics process (GPU) machine based bulk storage database in which bulk data may be stored. A bulk storage database may include multiple overlying business functions utilizing Artificial Intelligence (AI), Deep Learning and Computer Learning, thus a relationship between the terahertz transmitter device connected to the GPU machine-based storage database and a terahertz receiver device may be a master-slave relationship between a WPN and a client terahertz receiver. The terahertz transmitter device connected to a bulk storage database may be a node that is equivalent to other storage devices, and all the data and power transmission between any two nodes may be a point-to-point coordinating relationship. Therefore, a terahertz transmitter device may transmit power to a terahertz receiver device and the terahertz receiver device may also transmit data stored in the WPN therein connected to the terahertz transmitter device.

A terahertz receiver device may be placed within a certain distance of one another, wherein the distance may be an effective distance of terahertz wireless data communications and power transmission. A coverage area of a terahertz wireless signal may be limited, thus terahertz devices may be placed within an effective distance such that connection and unique match, power transmission, and the like may be performed.

First and terahertz receiver devices may validate each other so as to guarantee the security of the power transmission. When a connection and unique match between a first transmitter and terahertz receiver device are not successful, a connection and unique match error may be prompted. Alternatively, or additionally, a dialog may be presented to a user. Subsequent to a connection and unique match failure, a user may select whether to perform connection and unique match again. A prompting body may be either the first transmitter or the terahertz receiver device. When a connection and unique match between first and terahertz receiver devices are successful, a power transmission process may be performed.

When connection and paring are successful, power may be sent by a terahertz transmitter device to a terahertz receiver device using a terahertz wireless signal according to a user instruction. When connection and paring between the terahertz transmitter device and the terahertz receiver device are successful, a connection may be established between the terahertz transmitter device and the terahertz receiver device, and power transmission may be performed according to a user instruction. A power transmission may be performed using a terahertz wireless signal. A terahertz (THz) wave may be a terahertz ray. A terahertz ray may be an electromagnetic wave having an electromagnetism frequency between 0.1 THz and 10 THz (wavelength is between 3 mm and 30 um), and a wave range between microwave and far infrared rays. Based on the characteristics of larger transmission capacity and better directivity of a terahertz (THz) wireless communications, a transmission power rate of a terahertz wave may reach 10 Gbps. Therefore, a terahertz wave may include transmission of power and structured bulk data. Terahertz wireless communications may implement power transmission quickly, securely and stably.

Point-to-point power transmission may be implemented. A terahertz transmission device may transmit power to a plurality of terahertz transmission transmitter devices at the same time, thus, improving power transmission efficiency.

According to some embodiments, the present disclosure provides a Wireless Power Network (WPN) analogous to a Wi-Fi network for data connectivity. Accordingly, multiple receiver devices (E.g. smartphone, tablet, laptop computer, light bulbs, fans etc.) may be configured to receive wireless power transfer from a transmitter device of the WPN. Accordingly, the multiple receiver devices may be configured to detect the availability of the transmitter device for providing wireless power transfer. Further, the multiple receiver devices may also be configured to exchange data with the transmitter device over one or more communication channels (e.g. Bluetooth, NFC, Wi-Fi, cellular network, etc.). Based on the exchange of data, a receiver device may establish itself as an authorized device for receiving wireless power transfer from the transmitter device. For example, a receiver device may be paired with the transmitter device by use of a unique code associated with the receiver device. Accordingly, the transmitter device may acknowledge a power transfer request from the receiver device based on the presence of the unique code within the power transfer request.

According to some aspects, a terahertz wireless power based method and system (Wireless Power Network) for power transmission is disclosed. The terahertz wireless power based method and system comprising use of wireless power transmission application and system (WPN) for the (charging) of a terahertz transmitter and terahertz receiver devices utilizing a terahertz power transmission wave.

According to further aspects, a terahertz wireless power based method for power transmission, comprising placing a plurality of terahertz receiver devices within a terahertz wireless signal search range of a terahertz transmitter device, wherein the first and the plurality of terahertz receiver devices automatically and mutually detect whether an opposite side has a function of transmitting power through a terahertz wireless signal in response to the plurality of terahertz receiver devices being placed within the terahertz wireless signal search range of the terahertz transmitter device, and wherein the first and the plurality of terahertz receiver devices can consist of Internet of Things (IoT), mobile electronic devices, Smartphones, Wearables, Tablets, Gaming consoles and controllers, e-book readers, Remote controls, Sensors (in automobiles or such as thermostats) Toys Rechargeable batteries, Rechargeable lights, Automotive accessories and Medical devices etc.

Further, if both the terahertz transmitter device and the plurality of terahertz receiver devices detect mutually that the opposite side has the function of transmitting power through the terahertz wireless signal, automatically connecting and unique match are performed between the first and the plurality of terahertz receiver devices without user interaction.

Further, when the connection and unique match are successful, transmitting, by the terahertz transmitter device, the power to the plurality of terahertz receiver devices at the same time by point-to-point transmission using a terahertz wireless power signal, and according to a user interaction continuing, pausing, interrupting or retrying the power transmitting. The terahertz transmitter device and the plurality of terahertz receiver devices are in a master and slave relationship and the terahertz transmitter device is the master.

According to further aspects, the terahertz wireless power-based method for power transmission may include, when the connection and unique match are successful, selecting, by the terahertz transmitter device, data according to a user instruction. This includes enabling, by the terahertz transmitter device, a power transmission process according to the voice user interface instruction. Further, it includes determining, by the terahertz transmitter device, whether a state of a power/data transmission process is normal.

Further, if the state of the power and a AI enabled data transmission process is normal, controlling, by the terahertz transmitter device, the power/data transmission process according to the voice user interface instruction; and if the state of the power/data transmission process is abnormal, prompting the user of a power/data transmission error.

According to further aspects, the terahertz wireless power-based method for power transmission may include, if the state of the power transmission process is normal, the terahertz transmitter device prompting the user of the state and a parameter of the power transmission process.

According to further aspects, the terahertz wireless power-based method for power transmission, may include, when the connection and unique match are performed between the first and the plurality of terahertz receiver devices, performing unique match through exchanging unique match codes; when unique match codes of the first and the plurality of terahertz receiver devices are identical, the connection and unique match are successful.

According to further aspects, the terahertz transmitter device comprising at least one of can consist of Internet of Things (IoT) receiver devices, mobile electronic devices, Smartphones, Wearables, Tablets, Gaming consoles and controllers, e-book readers, Remote controls, Sensors (in automobiles or such as thermostats) Toys Rechargeable batteries, Rechargeable lights, Automotive accessories and Medical devices etc.

According to some aspects, a terahertz wireless power-based method for power transmission is disclosed. The method comprising placing a plurality of terahertz receiver devices within a terahertz wireless signal search range of a terahertz transmitter device, and performing connection and unique match between the first and the plurality of terahertz receiver devices.

Further, the method may include, when the connection and unique match are successful, automatically sending, by the terahertz transmitter device, structured data communication to the plurality of terahertz receiver devices at a same time delivering a point-to-point power transmission, using a terahertz wireless signal, in response to the plurality of terahertz receiver devices being placed within the terahertz wireless signal search range of the terahertz transmitter device.

Further, the structured data communication to be automatically sent is determined by a user prior to the connection and unique match of the first and the plurality of terahertz receiver devices.

Further, the method may include presenting to a user an invalidity of the plurality of terahertz receiver devices based on an absence of a function therein for transmitting data through a terahertz wireless signal.

According to further aspects, the terahertz wireless power-based method for power transmission may include performing connection and unique match between the first and the plurality of terahertz receiver devices. Further, the method may include detecting, by the terahertz transmitter device, whether the plurality of terahertz receiver devices has a function for transmitting power using a terahertz wireless signal.

Further, the method may include, if the plurality of terahertz receiver devices has the function for transmitting data using a terahertz wireless signal, performing connection and unique match between the first and the plurality of terahertz receiver devices respectively by accepting an operation instruction from the user; and if the plurality of terahertz receiver devices does not have the function for transmitting data using a terahertz wireless signal, prompting the user of an error.

According to further aspects, the terahertz wireless power-based method for power transmission may include, when the connection and unique match are successful, selecting, by the terahertz transmitter device, power according to a user instruction.

Further, the method may include enabling, by the terahertz transmitter device, a power, and data transmission process according to the user instruction.

Further, the method may include determining, by the terahertz transmitter device, whether a state of the data transmission process is normal; and if the state of the power transmission process is normal, controlling, by the terahertz transmitter device, the data transmission process according to the user instruction; and if the state of the power transmission process is abnormal, prompting the user of a power transmission error.

According to further aspects, the terahertz wireless power-based method for power transmission may include, if the state of the power transmission process is normal, the terahertz transmitter device prompting the user of the state and a parameter of the power transmission process.

According to further aspects, the terahertz wireless power-based method for power transmission may include, when the connection and unique match are performed between the first and the plurality of terahertz receiver devices, performing unique match through exchanging registration unique match codes; when registration unique match codes of the first and the plurality of terahertz receiver devices are identical, the connection and unique match are successful. The registration process will allow devices to be serviced on the network.

According to further aspects, the plurality of terahertz receiver devices includes at least one of: can consist of Internet of Things (IoT) receiver devices, mobile electronic devices, Smartphones, Wearables, Tablets, Gaming consoles and controllers, e-book readers, Remote controls, Sensors (in automobiles or such as thermostats) Toys Rechargeable batteries, Rechargeable lights, Automotive accessories and Medical devices etc.

According to some aspects, a terahertz wireless power-based system for power transmission. The terahertz wireless power-based system includes a terahertz transmitter device connected and uniquely matched with a plurality of terahertz receiver devices, the terahertz transmitter device sending power to the plurality of terahertz receiver devices at a same time by point-to-point power transmission using a terahertz wireless signal according to a user instruction, wherein the wireless power transmission happens quickly, securely, safely and stably in response to the plurality of terahertz receiver devices being placed within the terahertz wireless signal search range of the terahertz transmitter device.

Further, both the first and the plurality of terahertz receiver devices are provided with three AI enabled function: a first function, a second function, and a third function.

Further, the first function is a hardware detection layer which comprises a terahertz transceiver and the WPN. The terahertz transceiver receiving and sending the data and power using a terahertz wireless power transmission wave, and the WPN is used for storing the receiver data.

Further, the second function is an enable AI software which manages via WPN that manages power and data transmission and preferentially selects power and receiver data.

Further, the third function is interactive speech understanding voice commands where the WPN will communicate with the receiver device thru a personal digital assistant. If there is an error and the user will be prompted user through voice commands how to fix the invalidation of the plurality of terahertz receiver to issue maximum efficiency.

According to further aspects, the terahertz wireless power-based system for power transmission and the second function comprises a terahertz cloud-based communication interface with WPN, a terahertz protocol stack, a power-packing, and security engine and cloud-based network AI enabled system and a storage drive. Further, the disclosed system may include mechanisms for terahertz transmitters and receivers to report health and receive commands is managed by the WPN. Further, the disclosed system may include an interface for receiver device manufacturers to identify the wireless power chip unique match at the OS level. The terahertz communication interface drive controls a terahertz transceiver to receive data and send power transmission.

Further, the disclosed system may include the terahertz transmitter communication with the (WPN) protocol stack performs protocol layer data processing on data transmitted by the data packing and security engine from the terahertz receiver.

Further, the disclosed system may include the data packing and security engine performs corresponding processing on data transmitted by the WPN file system and the terahertz communication protocol stack.

Further, the disclosed system may include the system (WPN) and the storage drive call in the receiver data in the storage medium on the WPN.

According to further aspects, the terahertz wireless power-based system for power transmission may include the power transmission system and the storage drive store packed and encrypted data in a storage medium on the WPN.

According to further aspects, the terahertz wireless power based system for power transmission may include the WPN controlling the power transmission process by establishing a registration process that allows mobile devices to be charged and serviced on the WPN. The mechanisms for the WPN allow the transmitter the ability to intelligently locate the mobile receiver devices, identify the type of device, calculate the distance from the transmitter to the receiver, and detect how much of a battery charge the mobile receiver device needs. With this information, the WPN further provides a state and a parameter of the power transmission process.

According to further aspects, the terahertz wireless power based system for power transmission may include the terahertz transmitter device and the plurality of terahertz receiver devices includes at least one of: can consist of Internet of Things (IoT) receiver devices, mobile electronic devices, smartphones, autonomous vehicles, wearables, tablets, gaming consoles and controllers, e-book readers, remote controls, sensors (in automobiles or such as thermostats) toys rechargeable batteries, rechargeable lights, automotive accessories and medical devices etc.;

According to some embodiments, a method and system to facilitate blockchain based wireless power transfer that delivers power to devices such as, for example, IOT low-power sensors and mobile devices are disclosed.

According to some embodiments, a device in a network receives a network registration and power transmission request from a particular node. The network registration request comprises information about the particular node. The device causes performance of an authentication, identity, and validation of the information about the particular node via comparison of the information about the particular node to a distributed blockchain that includes information regarding the particular node and one or more other nodes. The device causes an update to the blockchain-based information about the particular node and the validation of the information about the particular node. The device uses the updated blockchain to control the behavior of the particular node and any other related node.

According to some embodiments, blockchain based methods and systems for wireless power transmissions are provided.

Further, a computer network is a geographically distributed collection of nodes interconnected by communication links and segments for transporting data between end nodes, such as mobile devices, personal computers, and workstations, or other devices, such as sensors, etc. Many types of networks are available, ranging from Unstructured or Omni-directional wireless mesh networks, Structured wireless mesh networks, peer to peer (P2P), local area networks (LANs) to wide area networks (WANs). In an unstructured wireless mesh network, each mesh node typically uses an Omni-directional antenna and is able to communicate with all the other mesh nodes that are within the transmission range. Structured wireless mesh networks are planned networks typically implemented using multiple radios at each node location and multiple directional antennas. Peer-to-peer (P2P) computing or networking is a distributed application architecture that partitions tasks or workloads between peers. Peers are equally privileged, equipotent participants in the application. They are said to form a peer-to-peer network of nodes. LANs typically connect the nodes over dedicated private communications links located in the same general physical location, such as a building or campus. WANs, on the other hand, typically connect geographically dispersed nodes over long-distance communications links, such as common carrier telephone lines, optical light paths, synchronous optical networks (SONET), synchronous digital hierarchy (SDH) links, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Further, the radio-frequency (RF)-based wireless technology consists of three different basic system functions, namely, wireless communication (data/voice), wireless sensing (parameter), and wireless powering transmission (energy). The first two well-known wireless applications have been found today in nearly all social and economic activities, which have been transforming our daily life. However, the terahertz wireless power transmission (WPT), which is unknown at least publicly, has not yet been developed and established as one of the fundamental driving forces for wireless powering (charging) of IOT and mobile devices.

Terahertz wave—also known as sub-millimeter radiation, terahertz radiation, tremendously high frequency, T-rays, T-waves, T-light, T-lux or THz—consists of electromagnetic waves within the ITU-designated band of frequencies from 0.3 to 3 terahertz (THz; 1 THz=1012 Hz).

Further, blockchain-based identity and transaction platforms—Information (e.g., a photo) for a person can be encrypted and stored in a blockchain as part of enrolling the person as a user in a blockchain-based identity and transaction platform. Trust relationships can be formed between the user and other users, and records of the trust relationships can be stored in the blockchain. Transactions between the user and other users with whom the user has formed a trust relationship can be authorized. Records of the transactions can also be stored in the blockchain. Authorization can involve, for example, a multi-stage verification process that accesses information stored on the blockchain. The transactions and identity information, along with other information, can contribute to an economic identity of the person. Storing an economic identity (and the underlying information that forms the economic identity of the person) in the blockchain results in a secure platform accessible to people regardless of their economic or geographic circumstances.

The trend of decentralization represents a massive wave of innovation that is reshaping society. Decentralized application platforms (Smart Contracts) are "self-executing" and "self-enforceable" transactions and do not require information to pass through a single point. Instead, many points connect, known as a peer-to-peer (P2P) network. Smart contracts remove the need for a "trusted third party" by providing a transparent, auditable, enforceable, and affordable means to conduct a variety of transactions over the blockchain. Currently, new kinds of Blockchain transactions and decentralized applications are emerging, along with new social norms and expectations. Crypto-currencies and smart contracts together act as the backbone to this new world. On the one hand, we are seeing the evolution of money, where the process of creating, transacting, and storing value has fundamentally changed with the invention of cryptocurrencies. On the other hand, we have Smart Contracts that introduce an added layer of facilitation, where agreements can be structured on the Blockchain to be both self-executing, and self-enforcing, providing a wide range of benefits and applications. Further, utility tokens, also called user tokens or application coins, represent future access to a company's product or service.

According to some embodiments, a disclosed method comprises receiving on a network, a network registration from a particular terahertz receiver node, wherein the network registration request comprises of a blockchain-based method on authentication, identity, and verification for the initiating of a wireless power transmission.

According to further embodiments, the information about a particular terahertz receiver node comprises of one or more of a node type, a group identifier, a unique receiver node identifier, or indication of the network to which the node requests registrations.

According to further embodiments, the update to the blockchain comprises a trust level for particular terahertz receiver node based on the authentication, identity, and validation about the particular receiver node.

According to further embodiments, the comparison of the authentication information about the particular node to the blockchain comprises a comparison between the information about the particular node to information regarding the node in the blockchain set by the manufacturer of the node.

According to further embodiments, using the updated blockchain to control the behavior of the particular terahertz receiver nodes and the one or more nodes for the initiating of a wireless power transmission.

According to further embodiments, the request comprises a public encryption key, the method further comprising: using by a device the public encryption key to authenticate the request by analyzing digitally signed information regarding the particular one of the other nodes in the updated blockchain.

According to further embodiments, the method includes determining, by the device, a location profile of the particular node; and causing, by the device, the updated blockchain to include the location profile of the particular node.

According to further embodiments, the method includes using, by the device, the updated blockchain to control behavior of the particular node and the one or more other nodes comprises: determining, by the device, a profile of the particular node; and comparing, by the device, the determined location, identity of the type of device, calculating the distance from the power transmitter to the receiver and detect how much of a battery charge the mobile receiver device needs to initiating of a wireless power transmission. According to further embodiments, the device is a terahertz receiver/harvester in the network According to some embodiments, a terahertz power transmitter/router apparatus is disclosed. The terahertz power transmitter/router apparatus includes one or more network interfaces that communicate globally on a cloud network. Further, the terahertz power transmitter/router apparatus includes multiple GPU processors coupled to the network interfaces and configured to execute one or more power transmission, and a memory configured to store an AI enable process executable by the GPU processor, the process when executed operable to receive a network registration request from a particular node, the network registration request comprises information about the particular node; cause performance of a validation of the information about the particular node via comparison of the information about the particular node to a distributed blockchain that includes information regarding the particular node and one or more other nodes, update to the blockchain based on the information about the particular node and the validation of the information about the particular node and use the updated blockchain to control behavior of the particular node and the one or more other nodes.

According to further embodiments, the information about the particular node comprises one or more of: a node type, a group identifier, a unique node identifier, or an indication of the network to which the node requests registration.

According to further embodiments, the update to the blockchain comprises a trust level for the particular node based on the validation of the information about the particular node.

According to further embodiments, the comparison of the information about the particular node to the blockchain comprises a comparison between the information about the particular node to information regarding the node in the blockchain set by a manufacturer of the node.

According to further embodiments, the apparatus uses the updated blockchain to control the behavior of the particular node and the one or more other nodes by receiving a request from a particular one of the other nodes; and processing the request based in part on a trust level in the updated blockchain that is associated with the particular one of the other nodes.

According to further embodiments, the request comprises a public encryption key, and wherein the process when executed is further operable to use the public encryption key to authenticate the power transmission request by analyzing digitally voice and biometric information regarding the particular one of the other nodes in the updated blockchain.

According to further embodiments, the process when executed is further operable to determine a location profile of the particular node; and cause the updated blockchain to include the location profile of the particular node According to further embodiments, the apparatus uses the updated blockchain.

Layer of Interaction to control behavior of the particular node and the one or more other nodes by determining, by the device, a location profile of the particular node; and comparing, by the device, the determined location identity the type of device, calculate the distance from the transmitter to the receiver and detect how much of a battery charge the mobile receiver device needs to initiating of a wireless power transmission.

According to further embodiments, the apparatus is a terahertz power transmitter/router.

The disclosed embodiments are related to all blockchain-based applications and mechanism for far-field power delivery to internet of Things (IoT) devices, mobile electronic devices, Smartphones, Wearables, Tablets, Gaming consoles and controllers, e-book readers, Remote controls, Sensors (in automobiles or such as thermostats), autonomous vehicles, Toys Rechargeable batteries, Rechargeable lights, Automotive accessories and Medical devices etc.

Referring now to figures, FIG. 1 is a block diagram of a receiver device 100 for facilitating wireless power reception in accordance with some embodiments. The receiver device 100 may include a receiver transceiver 102 configured for wirelessly communicating with at least one transmitter device. Further, the receiver transceiver 102 may be configured for receiving at least one transmitter characteristic data from the at least one transmitter device. Further, the receiver transceiver 102 may be configured for transmitting at least one receiver characteristic data to the at least one transmitter device. Further, the at least one transmitter device may be configured for controlling transmission of wireless power based on the at least one receiver characteristic data. Further, the receiver transceiver 102 may be configured for receiving wireless power transmission from the at least one transmitter device. Further, the receiver transceiver 102 may be configured for converting the wireless power transmission into electrical energy.

Further, the receiver device 100 may include a receiver processing device 104 communicatively coupled to the receiver transceiver 102. Further, the receiver processing device 104 may be configured for analyzing the at least one transmitter characteristic data. Further, the receiver processing device 104 may be configured for determining capability of the at least one transmitter device for transmitting wireless power receivable by the receiver device 100 based on the analyzing. Further, the receiver device 100 may include a receiver storage device 106 configured for storing the at least one receiver characteristic data.

Further, the receiver device 100 may include a power output port 108 communicatively coupled with the receiver transceiver 102. Further, the power output port 108 may be configured to be interfaced with at least one power input port of at least one electronic device. Further, the power output port 108 may be configured for supplying the electrical energy to the at least one electronic device.

In some embodiments, the receiver characteristic data may include receiver authentication data. Further, the at least one transmitter device may be configured for authenticating the receiver device 100 for wireless power transfer based on the receiver authentication data.

In some embodiments, the at least one transmitter characteristic may include transmitter authentication data. Further, the receiver processing device 104 may be configured for authenticating the at least one transmitter device based on the transmitter authenticating data. Further, the receiving of the wireless power from the at least one transmitter device may be based on the authenticating of the at least one transmitter device.

In some embodiments, the receiver device 100 may further include a microphone communicatively coupled to the receiver processing device 104. Further, the microphone may be configured for detecting a voice command. Further, the receiver processing device 104 may be further configured for analyzing the voice command. Further, the receiver processing device 104 may be configured for initiating the wireless communicating of the receiver device 100 with the at least one transmitter device based on the analyzing of the voice command.

In some embodiments, the wireless power transmission may include terahertz radiation.

In some embodiments, the receiver transceiver 102 may be further configured for pairing with at least one transmitter transceiver comprised in the at least one transmitter device based on one or more of the at least one transmitter characteristic data and the at least one receiver characteristic data. Further, the receiver transceiver 102 may be configured for establishing a wireless power transfer connection based on the pairing. Further, the wireless power transmission from the at least one transmitter device may be based on the wireless power transfer connection.

In some embodiments, the at least one receiver characteristic data may include a receiver device type of the receiver device 100, at least one distance between the receiver device 100 and the at least one transmitter device and an amount of power requested by the receiver device 100. Further, the at least one transmitter device may be configured for controlling the wireless power transmission based on one or more of the at least one distance and the receiver device type.

In some embodiments, the at least one transmitter characteristic data may include a transmitter device type of the at least one transmitter device, a transmission power level associated with the at least one transmitter device. Further, the receiver processing device 104 may be further configured for determining the at least one distance based on analyzing each of the transmitter device type of the at least one transmitter device, the transmission power level and at least one received power level corresponding to the wireless power transmission received from the at least one transmitter device.

In some embodiments, the at least one receiver characteristic data may include a receiver device type. Further, the at least one transmitter device may be configured for determining the at least one distance based on a measurement of loading created on at least one antenna corresponding to the at least one transmitter device due to the receiving of the wireless power transmission by the receiver device 100 from the at least one transmitter device.

In some embodiments, the receiver transceiver 102 may include a first receiver transceiver configured for communicating over a first frequency band and a second receiver transceiver configured for communicating over a second frequency band. Further, the first receiver transceiver may be configured for receiving at least one transmitter characteristic data and transmitting the at least one receiver characteristic data. Further, the second receiver transceiver may be configured for receiving the wireless power transmission from the at least one transmitter device. Further, the first frequency band may be characterized by frequencies lower than terahertz frequencies. Further, the second frequency band may be characterized by terahertz frequencies.

In some embodiments, the receiver transceiver 102 may be further configured for transmitting wireless power transmission to the at least one transmitter device. Further, the receiver processing device 104 may be further configured for analyzing the at least one transmitter characteristic data. Further, the receiver processing device 104 may be further configured for determining capability of the at least one transmitter device for receiving wireless power transmittable by the receiver device 100 based on the analyzing of the at least one transmitter characteristic data.

In some embodiments, the receiver device 100 may further include at least one sensor configured for sensing at least one variable associated with wireless power transfer between the at least one transmitter device and the receiver device 100. Further, the receiver processing device 104 may be further configured for analyzing the at least one variable. Further, the receiver processing device 104 may be further configured for generating a notification based on the analyzing of the at least one variable. Further, the receiver transceiver 102 may be further configured for transmitting the notification to a user device associated with the receiver device 100.

In some embodiments, the receiver processing device 104 may be further configured for determining an abnormal state of wireless power transfer based on the analyzing of the at least one variable. Further, the receiver device 100 further may include an input device configured for receiving an input from a user of the receiver device 100. Further, the wireless power reception may be based on the input.

In some embodiments, the receiver transceiver 102 may be further configured for transmitting a registration request to the at least one transmitter device. Further, the registration request may include a unique receiver device identifier. Further, the at least one transmitter device may be configured for accessing a distributed block-chain associated with wireless power transfer. Further, the at least one transmitter device may be further configured for analyzing the registration request. Further, the at least one transmitter device may be further configured for updating the distributed block-chain based on the analyzing of the registration request. Further, the at least one transmitter device may be further configured for transmitting a registration response to the receiver device 100. Further, the receiver transceiver 102 may be configured for receiving the registration response.

In some embodiments, the receiver device 100 may be associated with a domain. Further, the at least one transmitter device may be further configured for comparing the registration request with the distributed block-chain associated with the domain. Further, the transmitting of the registration response may be based on the comparing.

In some embodiments, the at least one receiver characteristic data may include a wireless power transfer request including the unique receiver device identifier. Further, the at least one transmitter device may be configured for accessing the distributed block-chain based on the wireless power transfer request. Further, the at least one transmitter device may be configured for authenticating the receiver device 100 based on a result of the accessing. Further, the at least one transmitter device may be configured for granting the wireless power transfer request based on the authenticating. Further, the wireless power transmission may be based on the granting.

In some embodiments, the distributed block-chain may include a trust level associated with the receiver device 100. Further, the authenticating of the receiver device 100 may be based on the trust level.

In some embodiments, the receiver device 100 may further include at least one sensor configured for sensing at least one variable associated with wireless power transfer between the at least one transmitter device and the receiver device 100. Further, the receiver may be further configured for storing the at least one variable in the distributed block-chain. Further, the at least one transmitter device may be further configured for retrieving the at least one variable from the distributed block-chain analyzing the at least one variable. Further, the at least one transmitter device may be further configured for determining a behavior of the receiver device 100 based on the analyzing of the at least one variable.

In some embodiments, the at least one transmitter device may be further configured for generating a trust level associated with the receiver device 100 based on the behavior. Further, the at least one transmitter device may be further configured for updating the distributed block-chain with the trust level associated with the receiver device 100.

In some embodiments, the at least one sensor may include a receiver location sensor configured to determine a geographical location of the receiver device 100. Further, the registration request may include the geographical location. Further, the at least one transmitter device may be further configured for updating the distributed block-chain with the geographical location of the receiver device 100.

Further disclosed is a transmitter device for facilitating wireless power reception. The transmitter device may include a transmitter transceiver configured for wirelessly communicating with at least one receiver device such as the receiver device 100. Further, the transmitter transceiver may be configured for receiving at least one receiver characteristic data from the at least one receiver device. Further, the transmitter transceiver may be configured for transmitting at least one transmitter characteristic data to the at least one receiver device. Further, the at least one transmitter device may be configured for controlling transmission of wireless power based on the at least one receiver characteristic data. Further, the transmitter transceiver may be configured for transmitting wireless power transmission to the at least one receiver device. Further, the receiver transceiver 102 may be configured for converting the wireless power transmission into electrical energy. Further, the transmitter device may include a transmitter processing device communicatively coupled to the transmitter transceiver. Further, the transmitter processing device may be configured for analyzing the at least one receiver characteristic data. Further, the transmitter processing device may be configured for determining capability of the at least one receiver device for receiving wireless power transmittable by the transmitter device based on the analyzing. Further, the transmitter device may include a transmitter storage device configured for storing the at least one transmitter characteristic data.

Further disclosed is an electronic device comprising a receiver device (such as the receiver device 100) for facilitating wireless power reception. The electronic device may include, for example, but is not limited to, a stationary computing device (a desktop computer), a mobile computing device (smartphone, tablet computer, a laptop computer, etc.), an IoT device, a wearable computing device (e.g. fitness band, smart glasses, VR headset etc.). The receiver device may include a receiver transceiver (such as the receiver transceiver 102) configured for wirelessly communicating with at least one transmitter device. Further, the receiver transceiver may be configured for receiving at least one transmitter characteristic data from the at least one transmitter device. Further, the receiver transceiver may be configured for transmitting at least one receiver characteristic data to the at least one transmitter device. Further, the at least one transmitter device may be configured for controlling transmission of wireless power based on the at least one receiver characteristic data. Further, the receiver transceiver may be configured for receiving wireless power transmission from the at least one transmitter device. Further, the receiver transceiver may be configured for converting the wireless power transmission into electrical energy. Further, the receiver device may include a receiver processing device (such as the receiver processing device 104) communicatively coupled to the receiver transceiver. Further, the receiver processing device may be configured for analyzing the at least one transmitter characteristic data. Further, the receiver processing device may be configured for determining capability of the at least one transmitter device for transmitting wireless power receivable by the receiver device based on the analyzing. Further, the receiver device may include a receiver storage device (such as the receiver storage device 106) configured for storing the at least one receiver characteristic data. Further, the receiver device may include a power output port (such as the power output port 108) communicatively coupled with the receiver transceiver. Further, the power output port may be configured to be interfaced with at least one power input port of the electronic device. Further, the power output port may be configured for supplying the electrical energy to the electronic device. In an instance, the electronic device may include a battery configured for storing electrical energy and providing power to the electronic device. Accordingly, the power output port may be electrically coupled to the battery in order to store the electrical energy in the battery.

Figure 2:
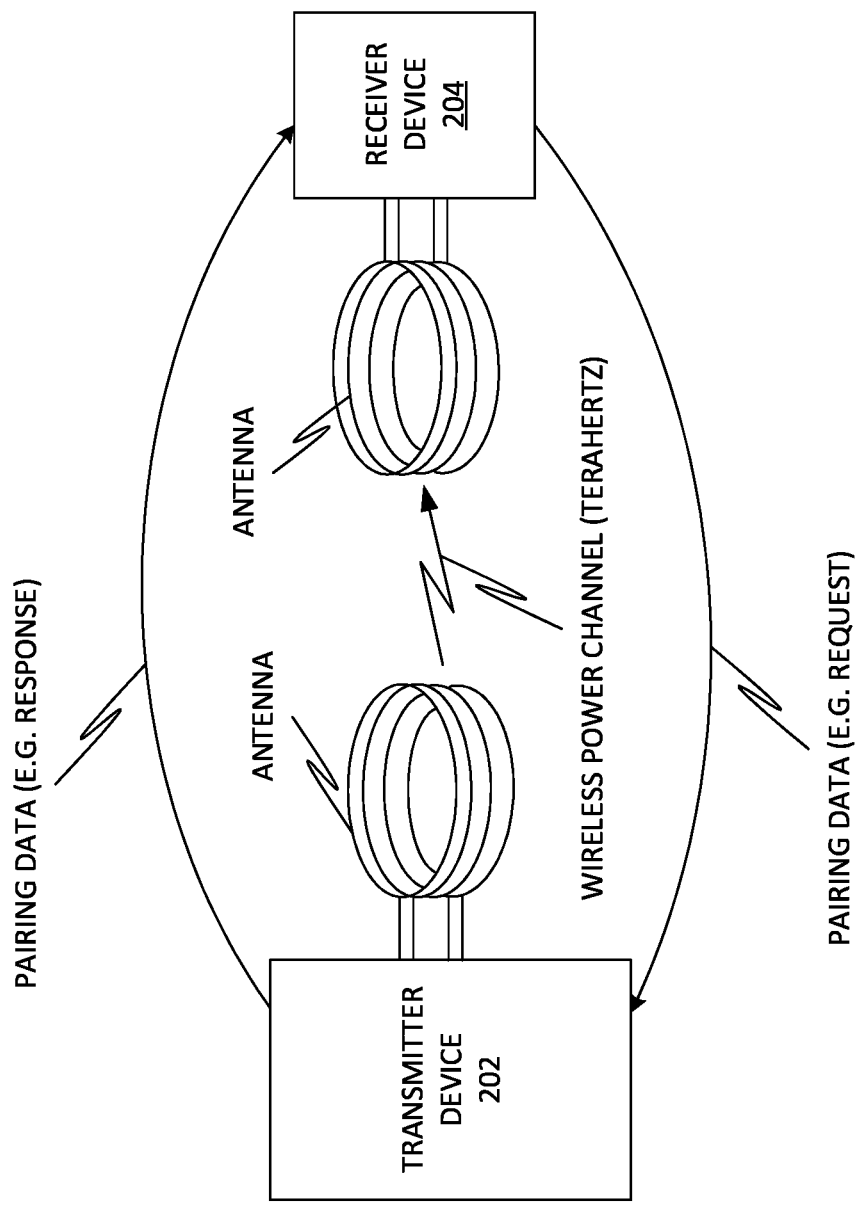
FIG. 2 illustrates exchange of pairing data between a wireless transmitter device and a wireless receiver device for facilitating wireless power transfer using terahertz frequencies, in accordance with some embodiments.

FIG. 2 illustrates exchange of pairing data between a wireless transmitter device 202 and a wireless receiver device 204 for facilitating wireless power transfer using terahertz frequencies, in accordance with some embodiments. As illustrated, in an embodiment, both the transmitter device 202 and the receiver device 204 may be configured to broadcast a functionality of transmitting and/or receiving wireless power transfer over one or more frequency bands (e.g. terahertz frequencies). Further, the broadcast may also include a unique identifier (i.e. a WPN-ID) associated with each of the transmitter device 202 and the receiver device 204. Accordingly, based on a mutual detection of the functionality, the receiver device 204 may transmit a pairing data (e.g. power transfer request) to the transmitter device 202. Accordingly, the transmitter device 202 may transmit a corresponding pairing data (e.g. a response) to the receiver device 204. In an instance, a mutually known code may be exchanged between the transmitter device 202 and the receiver device 204 in order to establish a pairing (similar to the pairing process of Bluetooth). Subsequently, wireless power transfer may be initiated.

Figure 3:
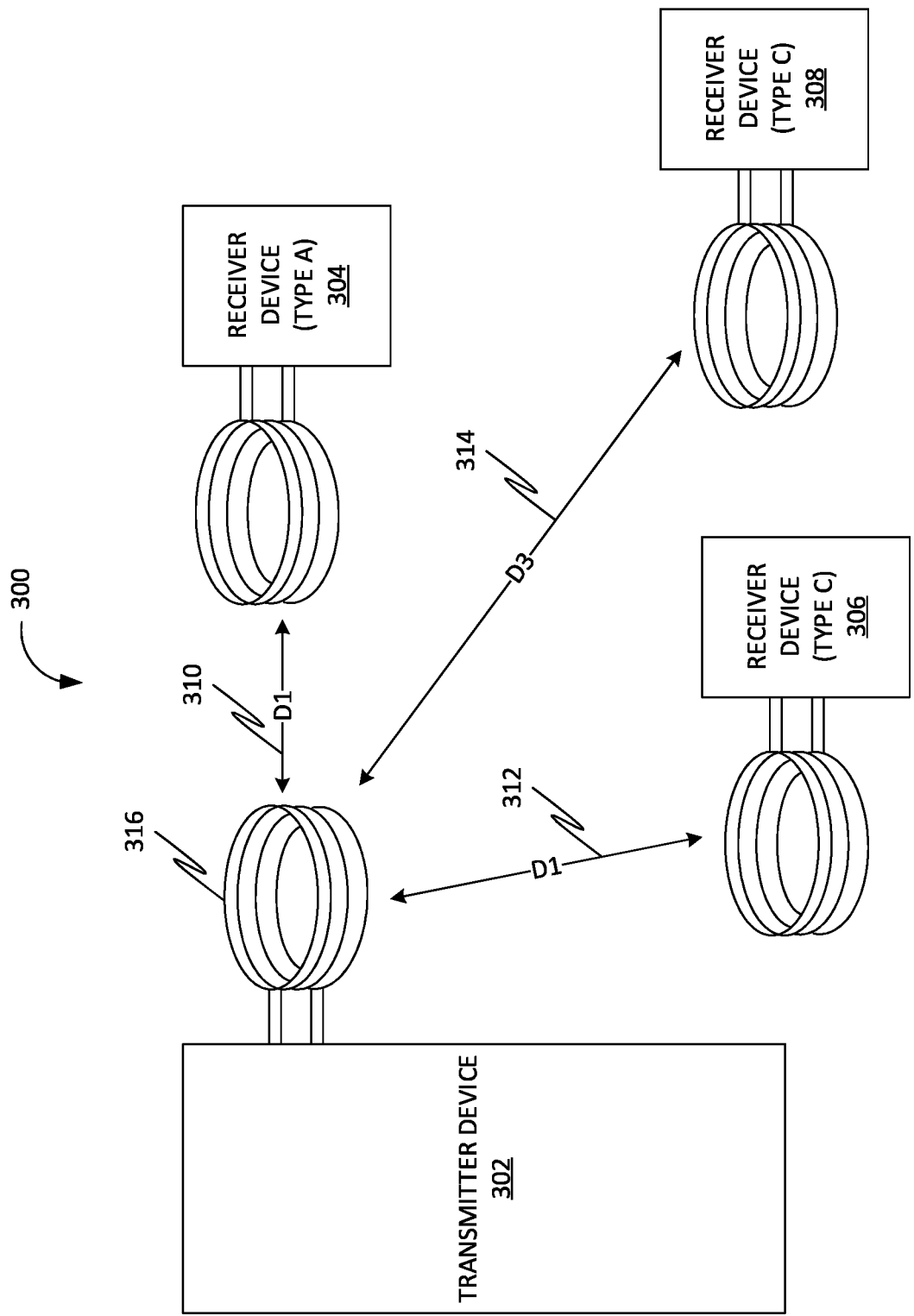
FIG. 3 illustrates a system for facilitating wireless transfer of power configured to adapt wireless transmission of power from a transmitter device to a plurality of receiver devices, in accordance with some embodiments.
Figure 7:
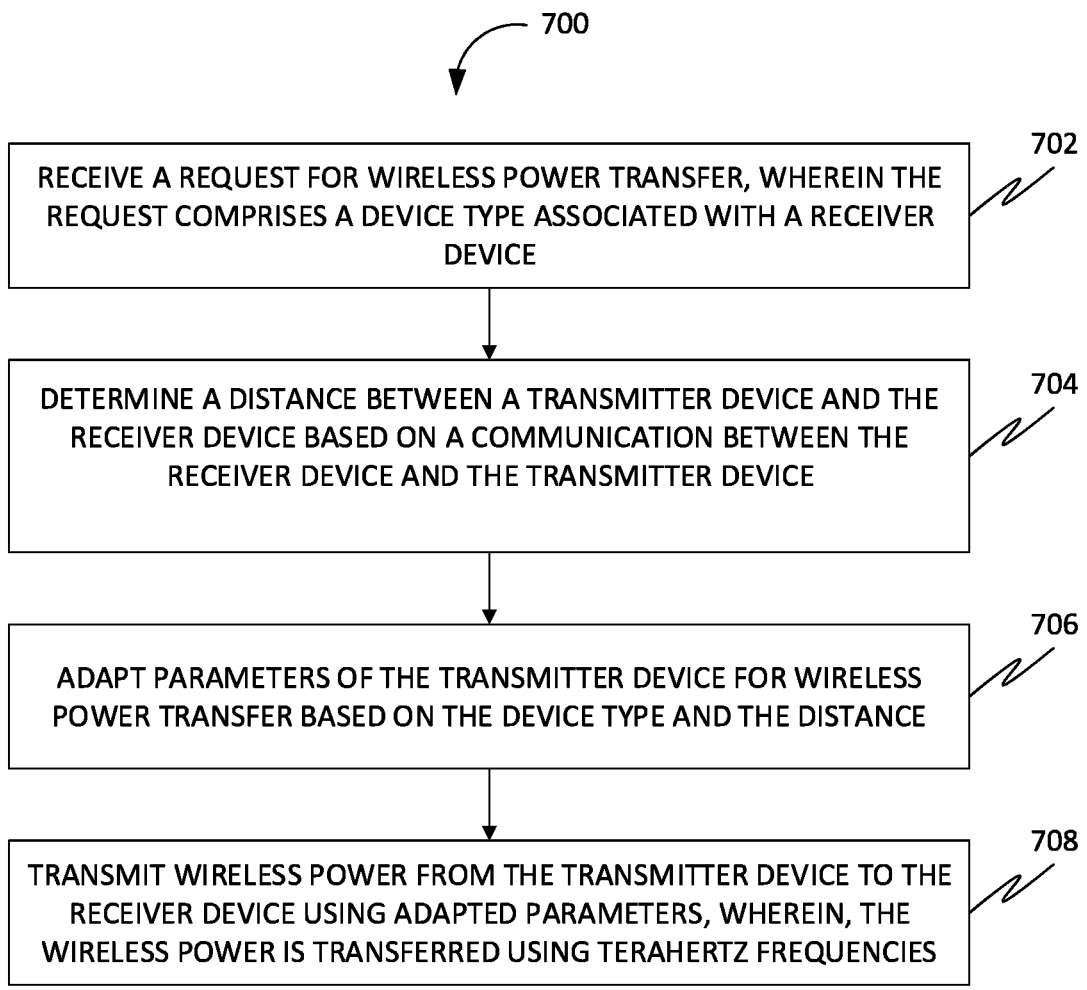
FIG. 7 illustrates a flowchart of a method of performing wireless power transfer using terahertz frequencies, in accordance with some embodiments.

FIG. 3 illustrates a system 300 for facilitating wireless transfer of power configured to adapt wireless transmission of power from a transmitter device 302 to a plurality of receiver devices 304-308 based on a plurality of device types and/or a plurality of distances 310-314 of the plurality of receiver devices 304-308 from the transmitter device 302, in accordance with some embodiments. As shown, the transmitter device 302 may be configured to wirelessly transfer power to the receiver devices 304-308 corresponding to a plurality of types and situated at the plurality of distances 310-314. Accordingly, the transmitter device 302 may first determine a device type corresponding to a receiver device. In an instance, the device type may be comprised in a request for wireless power transfer from the receiver device. Further, the transmitter device 203 may also be configured to determine a distance of the receiver device from the transmitter device 302. In an instance, the transmitter device 302 may determine the distance by determining an amount of loading present on a transmitter antenna 316 by the receiver device along with information about the device type. Accordingly, based on the device type and the distance, the transmitter device 302 may adapt parameters of wireless power transfer (e.g. frequency, voltage, current, phase, power factor, etc.). Further, FIG. 7 illustrates a flowchart of a corresponding method 700 of performing wireless power transfer using terahertz frequencies based on adaptively varying parameters of the transmitter device 302 according to a device type of a receiver device and a distance of the receiver device from the transmitter device 302, in accordance with some embodiments. At 702, the method 700 includes receiving a request for wireless power transfer, wherein the request comprises a device type associated with a receiver device. At 704, the method 700 may include determining a distance between a transmitter device and the receiver device based on a communication between the receiver device and the transmitter device. At 706, the method 700 may include adapting parameters of the transmitter device for wireless power transfer based on the device type and the distance. At 708, the method 700 may include transmitting wireless power from the transmitter device to the receiver device using adapted parameters, wherein the wireless power is transferred using terahertz frequencies.

Figure 4:
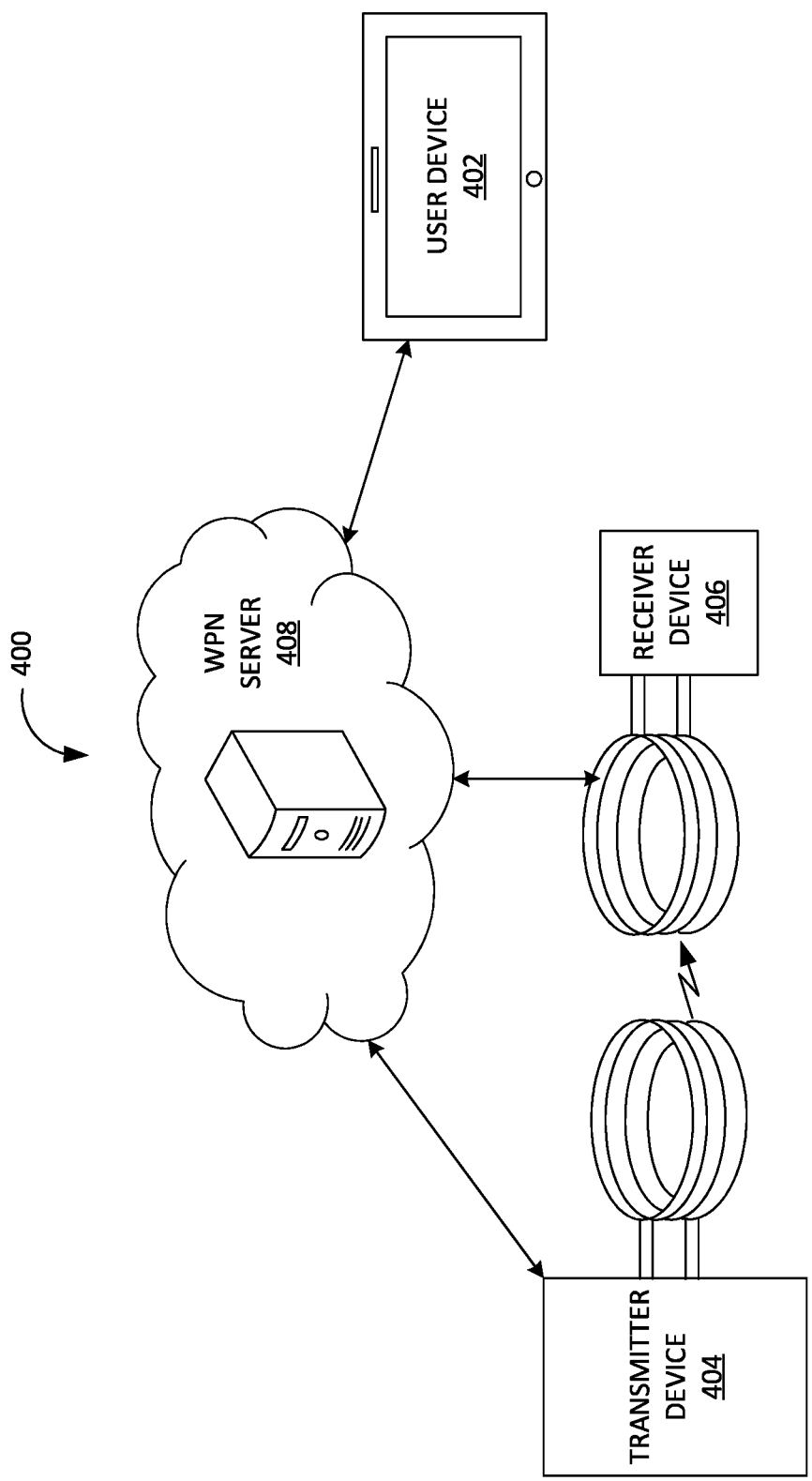
FIG. 4 illustrates a system for facilitating wireless transfer of power configured to transmit an alert to a user device regarding the wireless transmission of power from a transmitter device to a receiver device, in accordance with some embodiments.
Figure 8:
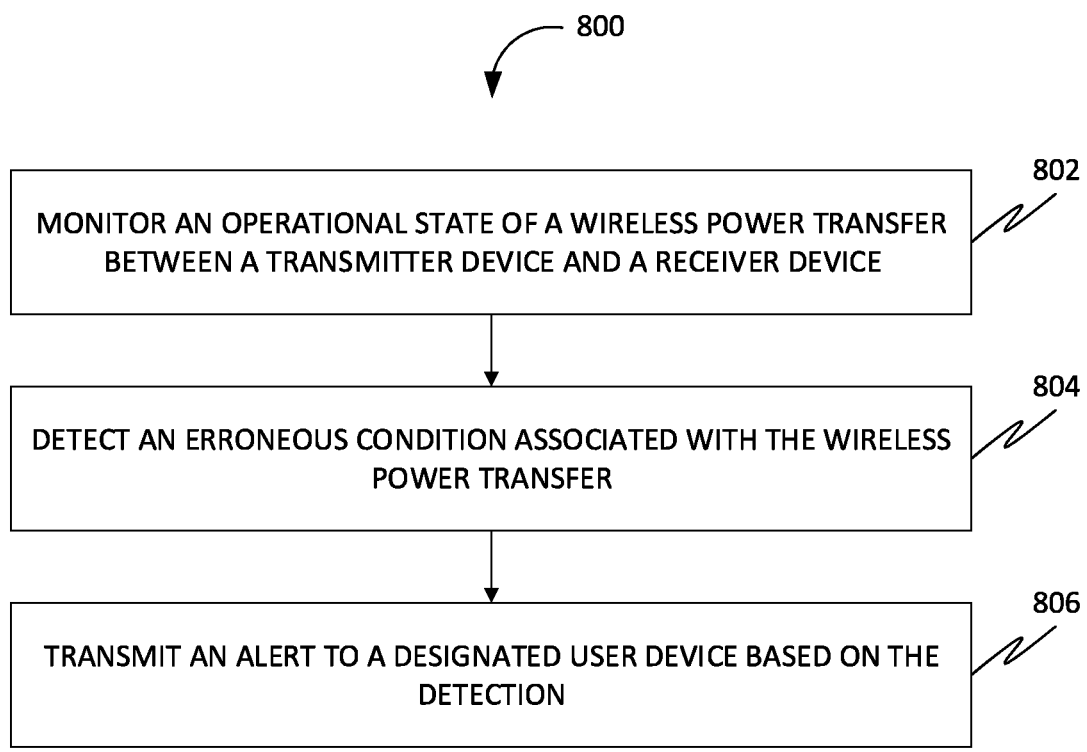
FIG. 8 illustrates a flowchart of a method of performing wireless power transfer using terahertz frequencies by transmitting an alert to a user device, in accordance with some embodiments.

FIG. 4 illustrates a system 400 for facilitating wireless transfer of power configured to transmit an alert to a user device 402 regarding the wireless transmission of power from a transmitter device 404 to a receiver device 406, in accordance with some embodiments. The alert may indicate an operational state of the wireless power transfer. For instance, during the pairing process, if there is any error, then the alert may be generated. As another example, if the receiver device 406 is not receiving sufficient wireless power within a time period, the alert may be generated. The transmitter device 404 and the receiver device 406 are connected the WPN server 408. Further, FIG. 8 illustrates a flowchart of a corresponding method 800 of performing wireless power transfer using terahertz frequencies by transmitting an alert to a user device based on a detection of an erroneous condition associated with wireless power transfer, in accordance with some embodiments.

Figure 5:
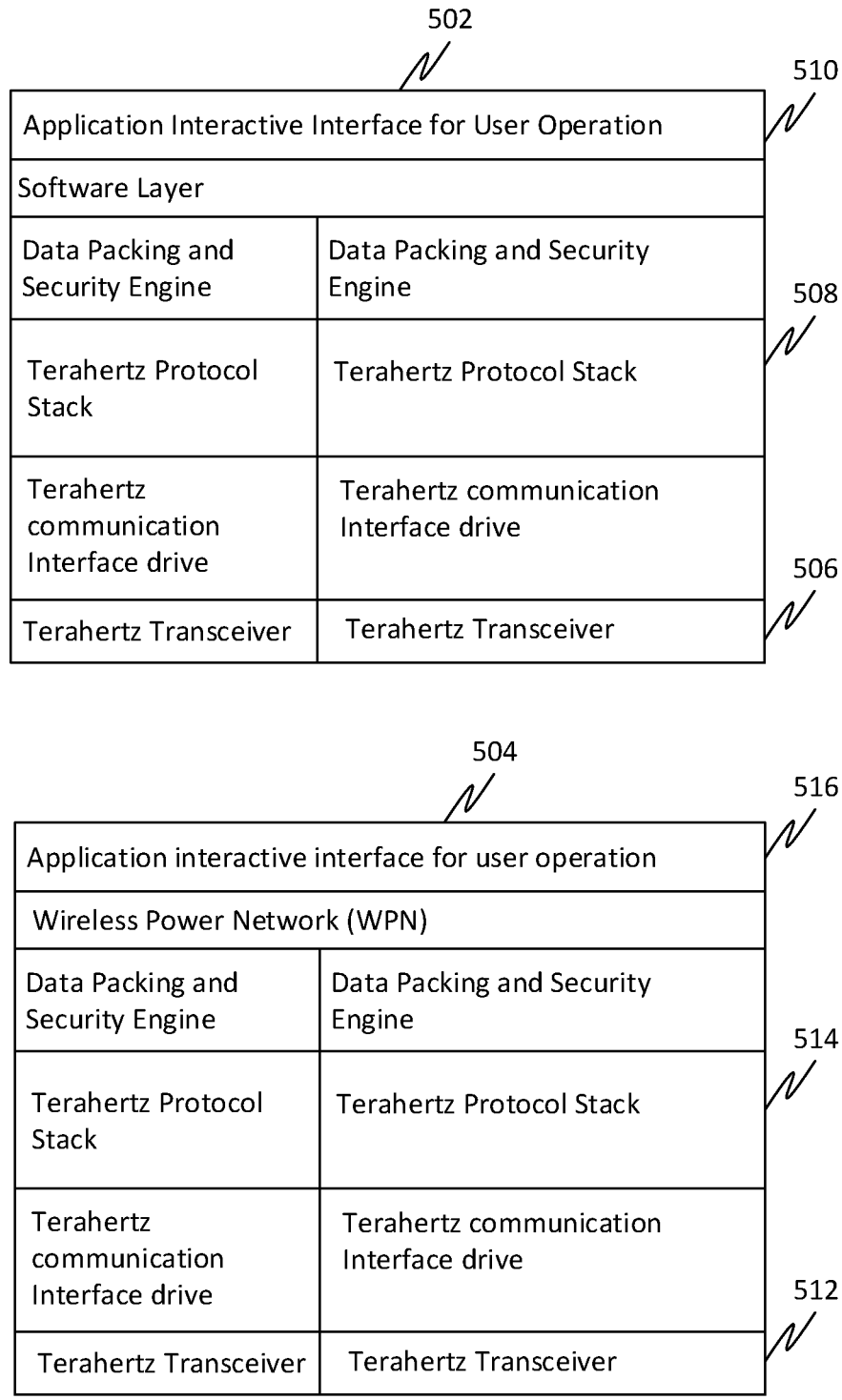
FIG. 5 illustrates wireless power transfer protocol stacks associated with the transmitter device and the receiver device, in accordance with some embodiments.

FIG. 5 illustrates wireless power transfer protocol stacks 502-504 associated with the transmitter device (such as the transmitter device 202) and the receiver device (such as the receiver device 204), in accordance with some embodiments. With reference to FIG. 5, a terahertz wireless power-based system may include a terahertz transmitter device (such as the transmitter device 202) and a terahertz receiver device (such as the receiver device 204). The terahertz transmitter device 202 may be connected and paired with the terahertz receiver device 204, and may send power to the terahertz receiver device 204 using a terahertz wireless signal according to a user instruction. The terahertz receiver device 204 may be used for receiving power sent by the terahertz transmitter device 202. The terahertz receiver device 204 may be within a terahertz wireless signal search range of the terahertz transmitter device 202.

Further, the terahertz transmitter device 202 and the terahertz receiver device 204 may be devices that support terahertz wireless power transmission. The terahertz transmitter device 202 and the terahertz receiver device 204 may be provided with three enabled functions: a first function, a second function, and a third function. As shown in FIG. 5, in order to distinguish conveniently, a first function, a second function and a third function of the terahertz transmitter device 202 may be respectively marked as 506-510, and a first function, a second function and a third function of the terahertz receiver device 204 are respectively marked as 512-516.

The first function 506 and/or the first function 512 may be a hardware layer, which may include a terahertz transceiver connected to WPN storage medium, wherein the terahertz transceiver 202 may be used for receiving and sending data using a terahertz wireless signal, and the WPN storage medium may be used for storing the terahertz receiver data. A storage medium may be a non-volatile data medium.

The second function 508 and/or the second function 514 may be a software layer, which may be used for implementing a function of a first function, such as a hardware layer. The second function 508 and/or the second function 514 may include a terahertz communication interface drive, a terahertz protocol stack, a data packing, and security engine, a file system and/or a storage drive.

Further, a terahertz communication interface drive may be used for controlling a terahertz transceiver to receive and send power and data. A terahertz transceiver may be used for receiving and sending power and data. A terahertz protocol stack may be used for performing protocol layer data processing on data. For example, a terahertz protocol stack may be used for performing such protocol layer data registration processing as a unique match, retransmission, unpacking or recombination and the like. A data packing and security engine may be used for packing, unpacking, encrypting and decrypting data, which may include packing, unpacking, encrypting and decrypting original data from the view of transmission efficiency and security.

Further, a store function may follow an existing storage mode. For example, a cloud-based storage may call a file access interface of a storage medium for a file system. A file system may provide a standard file access interface, such as a bulk transmission service manager or an application interactive interface, to a top-level function layer in an operating system.

When the terahertz transmitter device 202 externally transmits a data file, a storage drive may call a file access interface of a storage medium for a file system so as to read data stored in a storage medium. Data, after reading, may be transmitted to a data packing and security engine through a standard file access interface of a file system. Transmitted data may be packed and encrypted by a data packing and security engine and may flow in a terahertz communication protocol stack. After a terahertz communication protocol stack performs protocol layer data processing on data, a terahertz communication interface drive may control a terahertz transceiver to send the power transmission. When a terahertz storage device receives data, a terahertz communication interface drive may control a terahertz transceiver to receive the data, and may process the data using a terahertz communication protocol stack. Afterwards, data may be decrypted and unpacked by a data packing and security engine module to acquire original data. Data may be written in a storage medium through a file system and storage drive, thus, implementing storage of the data.

The third function 510 and/or the third function 516 may be an application interactive interface for user operation. A user may perform such operations as enabling, pausing or interrupting a data transmission process on an application interactive interface. During a power transmission process, the terahertz transmitter device 202 may prompt a user of a state and a parameter of a data transmission process. For example, a user may be presented some related indexes, such as power transmission progress, power transmission rate, error instruction, remaining time or file path, etc.

Further, the second function 508 and/or the second function 514 may include a specialized service layer, which may manage a wireless power transmission function to a terahertz receiver device. A service layer may be referred to bulk power transmission managed on the wireless power network (WPN). A WPN manages the bulk power transmission may be responsible for performing priority scheduling on power to be transmitted, and particularly, may manage structured bulk power transmission. For example, WPN power bulk transmission may preferentially transmit important or urgent power according to situations when a terahertz transmitter device transmits a lot of bulk power to a terahertz receiver device. When a terahertz transmitter device externally transmits power, WPN may manage the bulk power transmission may call a file access interface of a file system to read the data. Data to be read may be packed and encrypted by a data packing and security engine and may flow in a terahertz communication protocol stack. A terahertz communication protocol stack may perform protocol layer data processing on the data, and a terahertz communication interface drive may control a terahertz transceiver to send the data. The WPN connected to terahertz transmitter device may receive a data file according to a reverse of the foregoing process, wherein a terahertz communication interface drive may receive data, and may process the data using a terahertz communication protocol stack. Afterwards, data may be decrypted and unpacked by a data packing and security engine module to acquire original data, and the data may be written in a storage medium through a file system and a storage drive, thus, implementing storage of the data.

Compared with traditional relational databases, a bulk power transmission (WPN) may manage a structured bulk power transmission process and meet demands of structured bulk power processing and mining. Power Transmission may be based on structured bulk data, which may be information stored in a file system rather than a database. In mobile Internet development, a growing rate of unstructured data is far greater than that of structured data (e.g., data based on a relational database). A method for power transmission of the present disclosure may be based on unstructured bulk data, which caters to the mobile Internet development trend, and can better meet demands of unstructured bulk data processing and mining.

Further, terahertz wireless power-based methods and systems for power transmission may include a terahertz transmitter device and a terahertz receiver device placed within an effective distance to each other, and, by means of connection and neural match unique match between the terahertz transmitter device and the terahertz receiver device, power in the terahertz transmitter device may be transmitted to the terahertz receiver device via a terahertz wireless signal. Rapid transmission of data and power between terahertz devices is implemented, matched with a novel data interactive model in a terahertz WPN, and may perform data interaction quickly, stably and securely. In addition, optimization on a physical structure of a product may be implemented using WPN, thus, allowing completion of transmission and exchange of data in a scenario in which a transmission medium cannot be released.

Figure 6:
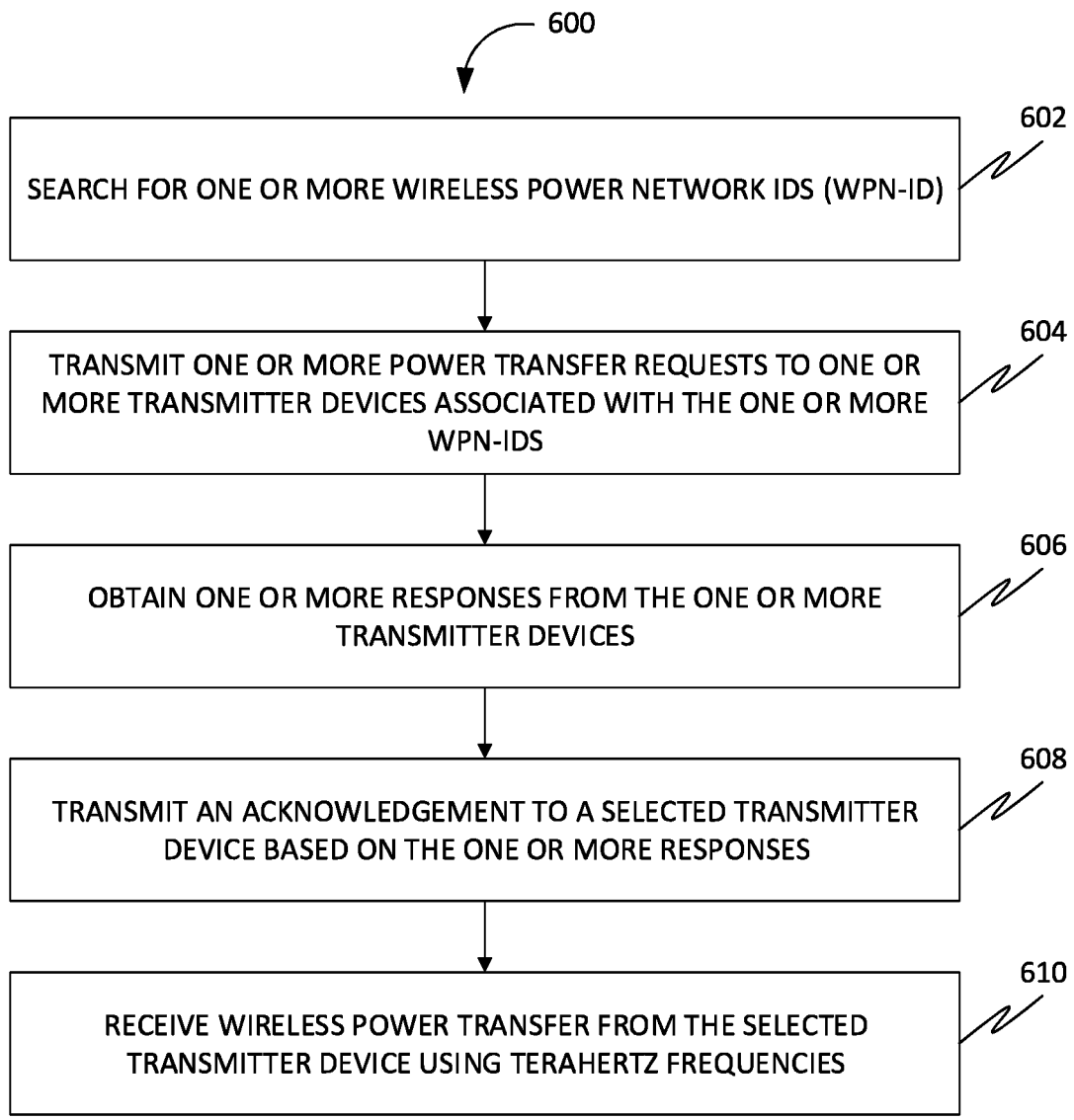
FIG. 6 illustrates a flowchart of a method of performing wireless power transfer using terahertz frequencies, in accordance with some embodiments.

FIG. 6 illustrates a flowchart of a method 600 of performing wireless power transfer using terahertz frequencies based on a search for transmitter devices and pairing between a transmitter device (such as the transmitter device 202) and a receiver device (such as the receiver device 204), in accordance with some embodiments.

At 602, the method 600 may include searching for one or more Wireless Power Network IDs (WPN-ID). Further, at 604, the method 600 may include transmitting one or more power transfer requests to one or more transmitter devices associated with the one or more WPN-IDs. Further, at 606, the method 600 may include obtaining one or more responses from the one or more transmitter devices. Then, at 608, the method 600 may include transmitting an acknowledgment to a selected transmitter device based on the one or more responses. Next, at 610, the method 600 may include receiving wireless power transfer from the selected transmitter device using terahertz frequencies.

Also provided herein, is a connection and unique match process for use in a terahertz wireless power-based method for power transmission is depicted. The process may include detecting, by a terahertz transmitter device, whether a terahertz receiver device includes a function for transmitting power through a terahertz wireless signal. This method uniquely matches two or more system elements using a terahertz signal or a waveform.

When a terahertz transmitter and terahertz receiver device are placed within an effective distance, the terahertz transmitter device may detect whether the terahertz receiver device is effective. The former may detect whether the latter may receive power through a terahertz wireless signal. The process may be mutual. A terahertz receiver device may detect whether a terahertz transmitter device is effective.

When a terahertz transmitter device and terahertz receiver device are matched, the first and the terahertz receiver devices may respectively receive an operation instruction from a user to perform connection and unique match. When a terahertz transmitter device and terahertz receiver device are not matched, a user may be presented with an error. Subsequent to an initial failure to be matched, a user may select to retry.

When a terahertz receiver device is an effective one, the connection and unique match may be performed between a terahertz transmitter device and the terahertz receiver device. The unique match may be performed through exchanging unique match registration codes between terahertz transmitter and terahertz receiver devices. Unique match registration codes exchange may refer to two devices mutually validating unique match registration codes. When unique match registration codes of terahertz transmitter device and terahertz receiver device are identical to each other, the two may be mutually validated. Security validation for power transmission may be acquired such that power transmission may be performed securely. A connection and unique match process may ensure security and reliability of a power transmission. When it is detected that a terahertz receiver device does not have a function for transmitting data and receiving power through a terahertz wireless signal, invalidity of the terahertz receiver device may be presented to a user, and the user may select whether to retry.

Further disclosed herein, is a power transmission process for use in a terahertz wireless power-based method for power transmission. When connection and paring are successful, a terahertz transmitter device may select data according to a user instruction. A user may select data to be transmitted in advance, and a terahertz transmitter device may select data according to the selection of the user.

Further, the power transmission process may include enabling a terahertz transmitter device according to a user instruction. Subsequent to a user selecting power to be transmitted, a terahertz transmitter device may prompt the user whether to enable a power transmission process, and may perform a power transmission process if the user selects yes. Alternatively, a user, after finding that selected power is wrong, may select to not enable a power transmission process, and may correct data for transmission.

Further, the power transmission process may include determining, by a terahertz transmitter device, whether a state of a power transmission process is normal. For example, a terahertz transmitter device may determine whether a state of a power transmission process is normal. Indices for reference may include transmission progress, transmission rate, and the like. A user may view whether a power transmission process is normal, and when a problem exists, the user may correct the problem.

When a state of a power transmission process is normal, a terahertz transmitter device may continue, pause or interrupt the data transmission process according to a user instruction. When a state of a power transmission process is abnormal, a user may be presented a power transmission error and/or may be prompted to retry power transmission. Subsequent to an initial power transmission error, a user may reselect data so as to realize power transmission. A user may be provided with an application interactive interface on which the user may perform such operations as enabling, pausing or interrupting a power transmission process. A terahertz transmitter device may prompt a user of a state and a parameter of a power transmission process. For example, a user may be prompted with some related indexes, such as power transmission progress, power transmission rate, error instruction, or remaining time etc.

Further, a terahertz transmitter device may function as a master. A terahertz receiver device may not function as a master. A user may operate a terahertz receiver device, and the terahertz receiver device may enable, continue, pause or interrupt a power transmission process according to a user instruction. Alternatively, a terahertz receiver device may detect a state of a power transmission process. Two terahertz devices operate as a master-slave relationship with the transmitter being the master.

Further, in some embodiments, the method of performing wireless power transfer using terahertz frequencies may include transmitting an alert to a user device based on a detection of an erroneous condition associated with wireless power transfer, as illustrated in FIG. 8. Accordingly, one or more of the transmitter device and the receiver device may monitor an operational state of the wireless power transfer process at 802. Further, based on the monitoring, an erroneous condition may be detected at 804. For example, if the receiver device does not receive a response from the transmitter device within a predetermined time period of transmitting a request for power transfer, the receiver device may detect the erroneous condition. Similarly, as another example, the transmitter device may sense a load on the transmitter antenna during the wireless transfer process and based on the sensing, the transmitter device may determine an erroneous condition at the receiver device that is preventing normal power transfer. Accordingly, based on the detection of the erroneous condition, one or more of the transmitter device and the receiver device may generate and transmit an alert to a designated user device through a WPN server at 806.

Figure 9:
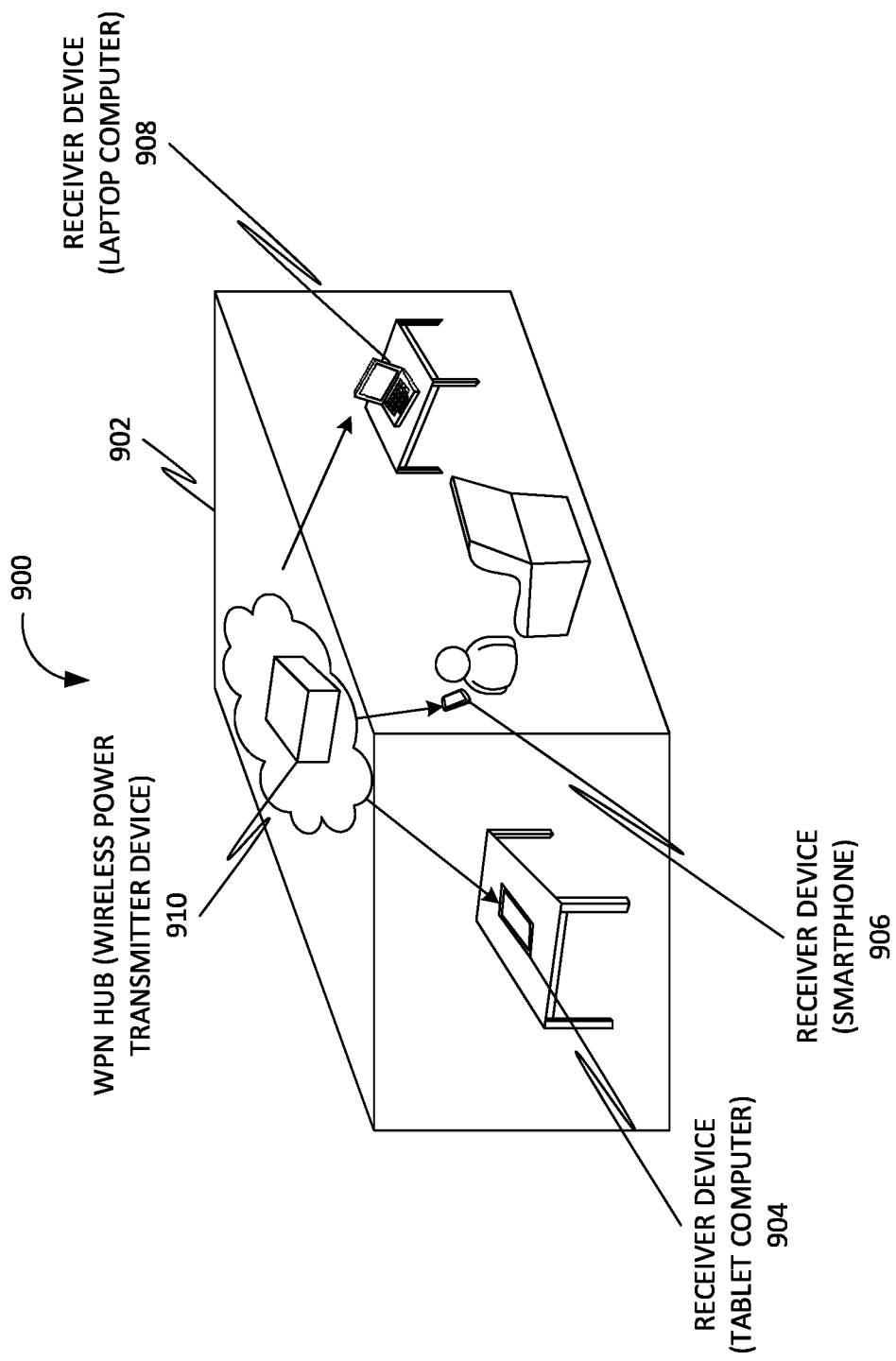
FIG. 9 illustrates an environment in which the disclosed systems and methods may operate.

FIG. 9 illustrates an environment 900 in which the disclosed systems and methods may operate. The environment 900 may include a room 902 in which there is are multiple receiver devices 904-908 (electronic devices). Further, the environment 900 may include a transmitter device 910 configured to wirelessly transmit power (using terahertz frequencies) to the multiple receiver devices 904-908.

Figure 10:
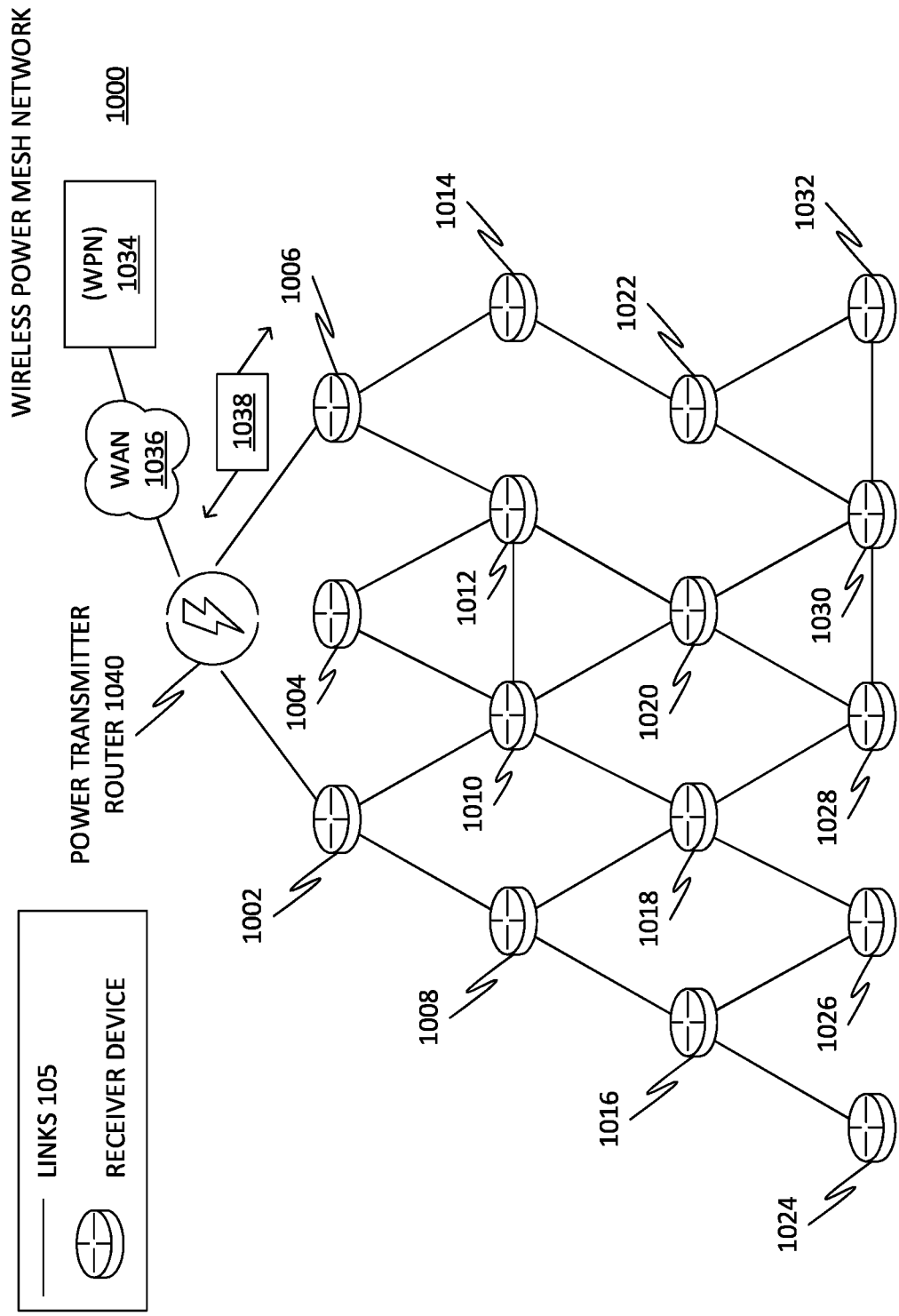
FIG. 10 illustrates an example of a blockchain based wireless power mesh network, in accordance with some embodiments.

According to some embodiments, the present disclosure provides an example of a blockchain based wireless power transmission network. FIG. 10 is a schematic block diagram of an exemplary computer network 1000 illustratively comprising one or more nodes/devices 1040, receiver devices 1002-1032, and a wireless power mesh network (WPN) server 1034, all of which may be interconnected by various methods of communication. For instance, they may be interconnected via wired links or shared media such as wireless links, PLC links, and so on (links 105), where certain receiver devices in the receiver devices 1002-1032, such as, e.g., drones, sensors, smartphones, notebook computers, etc., may be in communication with other receiver devices in the receiver devices 1002-1032 based on distance, signal strength, current operational status, location, etc. Further, the receiver devices 1002-1032 may communicate with any number of external devices, such as wireless power mesh network server(s) 1034 over a network 1036, which may be a WAN in some implementations. For example, the receiver device 1026 may send sensor data to WPN server 1034 for further processing, either via a local network or via a WAN. WPN server 1034 may include but may not be limited to wireless power mesh network management system (WPNMS) devices, supervisory control and data acquisition (SCADA) devices, enterprise resource planning (ERP) servers, other network administration devices, or the like. Further, one or more utility tokens, that may represent access to one or more products or services may reside on any one or more receiver devices in the receiver devices 1002-1032, such as Internet of Things (IoT) devices, drones, mobile electronic devices, smartphones, wearables, tablets, gaming consoles and controllers, e-book readers, remote controls, sensors (in automobiles or such as thermostats), autonomous vehicles and so on. The one or more nodes 1040, and the receiver devices 1002-1032 may exchange data packets 1038 (e.g., location and/or messages sent between the devices/nodes) using predefined network communication protocols such as certain known wired protocols, wireless protocols (e.g., IEEE Std. 802.15. 4, Wi-Fi, Bluetooth, and so on), PLC protocols, or other shared—media protocols where appropriate. In this context, a protocol may consist of a set of rules that may define how the one or more nodes/devices may interact with each other.

Figure 11A:
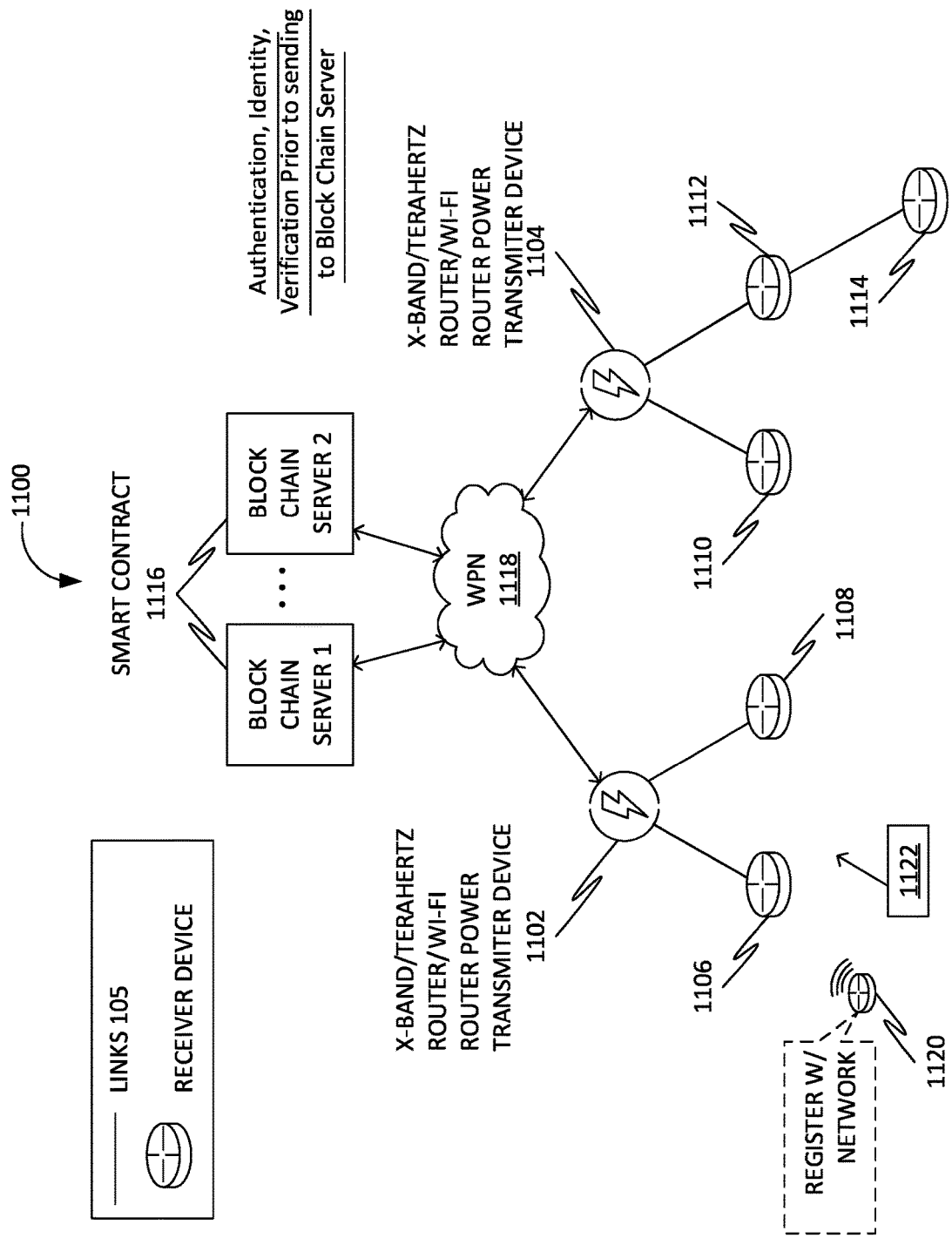
FIGS. 11A-C illustrate examples of blockchain receiver node registration with a wireless power mesh network, in accordance with some embodiments.
Figure 11B:
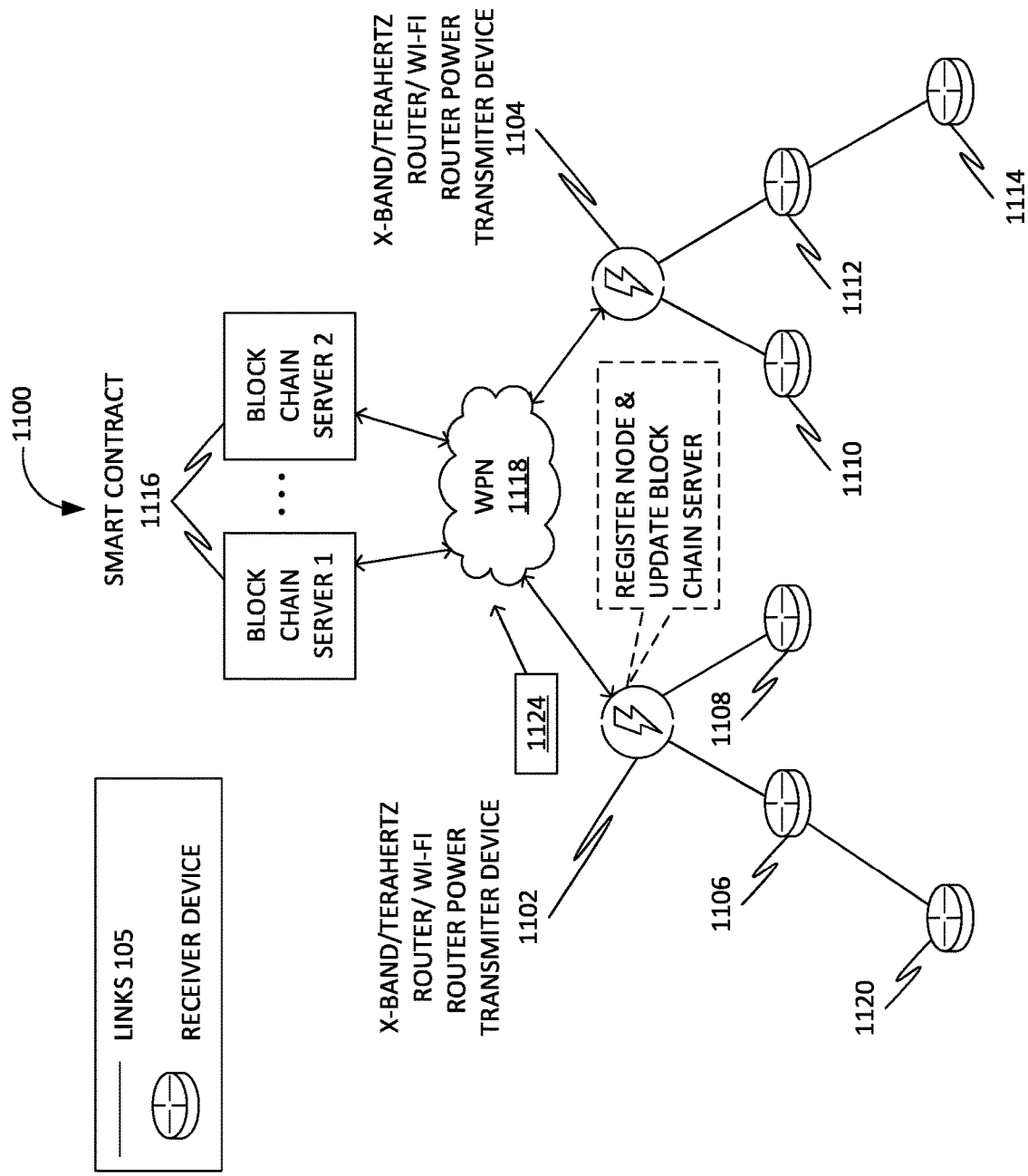
Figure 11C:
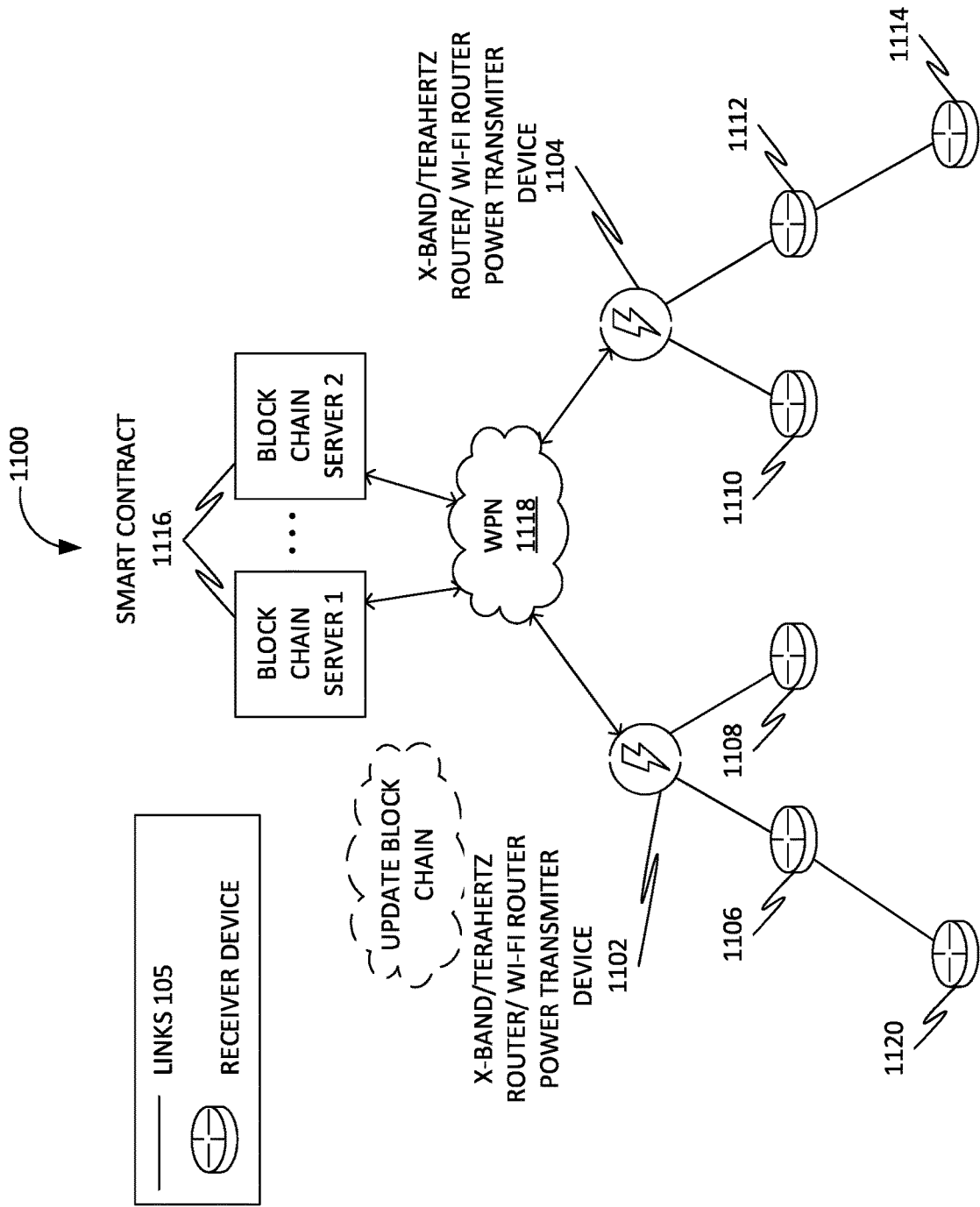

FIGS. 11A-C show an exemplary embodiment of a system 1100 to facilitate wireless charging of IoT devices and electronic devices, displaying one or more receiver devices registering with a network. Accordingly, as shown in FIG. 11A, a network may include one or more power transmitter devices 1102-1104. In some embodiments, the devices 1102-1104 may include routers (e.g., terahertz power transmitter/router etc.) located on the edges of local networks may comprise of one or more IoT nodes or receiver devices. For instance, receiver devices 1106-1108 may be registered with the power transmitter device 1102 forming a first local network and receiver devices 1110-1114 may be registered with the power transmitter device 1104 forming a second local network. Further, as shown, the power transmitter devices 1102-1104 may be in communication with one or more blockchain servers 1116 through WAN 1118, that may host a blockchain network. In some embodiments, the one or more blockchain servers 1116 may be configured as smart-contracts, as self-executing pieces of code, which may be stored in the blockchain network. The smart contracts may stipulate one or more terms of the agreement between one or more devices of the network, such as receiver devices, power transmitter routers, and so on. Smart contracts may further define which actions may be executed upon fulfillment of certain conditions and may be configured to communicate in a peer-to-peer manner to share blockchain information with one or more blockchain servers. Generally, the blockchain may comprise information about one or more devices that may join the network, such as through registration with the power transmitter devices 1102-1104. In some embodiments, the blockchain may be stored on one or more devices registered on the network, such as power transmitter devices, power receiver devices, and so on. Further, if a new receiver device, such as the receiver device 1120 attempts to register with the power transmitter device 1102, the receiver device 1120 may send a registration request 1122 that may include identification information for the receiver device 1120 and/or any other metadata relating to the receiver device 1120 towards the power transmitter device 1102. For instance, a registration request 1122 may include one or more of receiver device ID, receiver device type, information about one or more access tokens or utility tokens, group ID, identity trust level, timestamp, and so on.

Further, as shown in FIG. 11B, the power transmitter device 1102 may process registration request 1122 from the node and register the transaction with the blockchain by sending a notification 1124 to the blockchain server 1116. In some embodiments, the power transmitter device 1102 may already be registered and present in the blockchain (e.g., as updated via a registrar) with a high trust level (e.g., based on the transaction). The power transmitter device 1102 may include any or all of the receiver device information from registration request in the notification 1124. Further, the power transmitter device 1102 may also include any other information regarding node 1120 obtained from the local network or independently by the power transmitter/router device 1102. In some embodiments, the notification 1124 may also include one or more digital signatures, for purposes of ensuring that edge device 1102 actually sends the notification 1124, ensuring that the information was originally provided by the node 1120, etc. Based on the notification 1124, any number of network devices (e.g., blockchain server 1116, other devices, etc.) may validate the information regarding the receiver device 1120. For example, as shown in FIG. 11C, a blockchain server 1116 or another device in communication therewith (e.g., a power transmitter device, etc.) may act as a validator for the information included in the notification 1124. In some embodiments, a local validator may be used by the device seeking validation (e.g., power transmitter device 1, receiver device A, etc.), to restrict public key distribution. Further, in other embodiments, a standalone validator may be used for validation. To process the notification 1124, the validator may use of one or more public keys associated with a digital signature in the notification 1124, thereby ensuring that the notification 1124 may have been sent by the trusted power transmitter 1102. Then, in turn, the validator may compare the information regarding the receiving device 1120 to the blockchain, to ensure the validity in view of what may be already known about the receiver device 1120 in the blockchain.

Finally, as shown in FIG. 11C, the blockchain server 1116 may update the blockchain through a smart contract and add the details regarding the receiver device 1120 to the blockchain based on the validation. Further, all the other nodes/devices in the network may have also have access to the information about the receiver device 1120 through the blockchain. Accordingly, the distribution of the blockchain may allow all nodes/devices to verify the identity of the receiver device 1120 such as when the receiver device 1120 may migrate to another local network, to detect anomalies (such as by comparing profile information or other behavioral information regarding the receiver device 1120 stored in the blockchain to an observed behavior of the receiver device 1120 and to perform other functions using the shared information about the receiver device 1120.

Further, upon of registration of the receiver device 1120 with the power transmitter device 1102, the receiver device 1120 may be able to receive power wirelessly from the power transmitter device 1102. Accordingly, the resultant change in power and all similar updates related to the power level of the receiver device 1120 may be updated on the blockchain. The updates in the blockchain may be made by the power transmitter device 1102. Alternatively, the receiver device 1120 may also update the blockchain. However, in some embodiments, the receiver device 1120 may not have enough power to update the blockchain. Accordingly, the change in power and all similar updates related to the power level of the receiver device 1120 may be stored on an intermediary device and may be updated on the blockchain.

Further, in some embodiments, the blockchain may be hosted on one or more receiver devices on the network based on a power level of the one or more receiver devices. Accordingly, one more power transmitter devices to which the one or more receiver devices may be connected may constantly retrieve a power level of the one or more receiver devices. Accordingly, if the one or more receiver devices are below a predetermined level of power, the blockchain may not be hosted on the one or more receiver devices.

Further, in some embodiments, the blockchain may not be hosted on one or more receiver devices on the network owing to a possibility that the one or more receiver devices may not have a required power level to stay connected on the network, which may lead to an unreliable blockchain network, which may not be accessible when the one or more receiver devices do not have enough power level to stay powered on to be able to host the blockchain.

Further, in an embodiment, a blockchain network may also include a cryptocurrency associated with the blockchain network. The cryptocurrency tokens may be stored on one or more receiver devices. Accordingly, the one or more receiver devices may have to transmit one or more cryptocurrency tokens to a wallet associated with one or more power transmitter devices to receive power. The number of tokens that may need to be transferred to the one or more wallets of the one or more power transmitting devices may depend on the amount of power that the one or more power receiver devices may need to receive. Accordingly, details about the transfer of the one or more cryptocurrency tokens may be stored on the blockchain network.

Figure 12A:
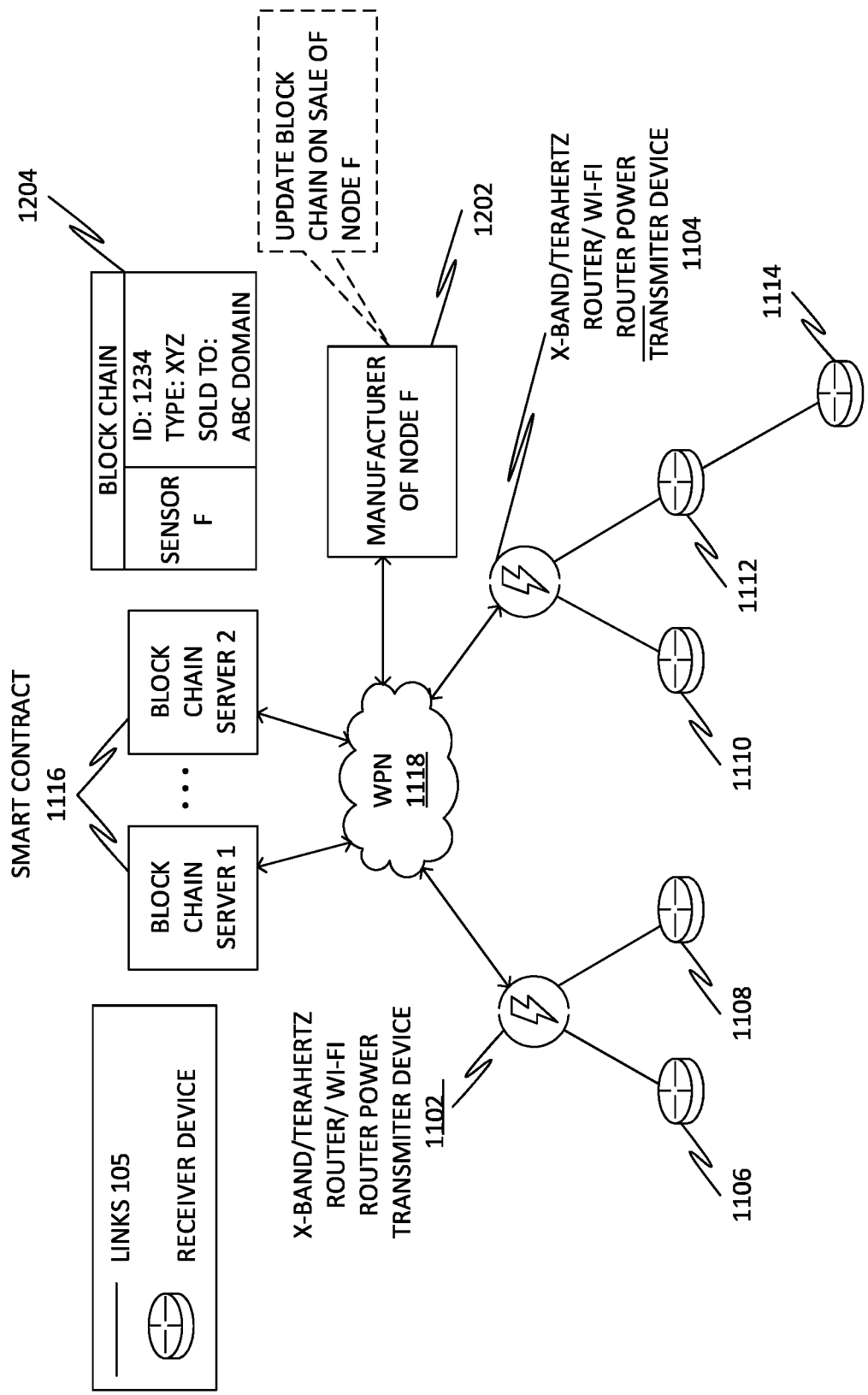
FIGS. 12A-E illustrate examples of power transmitter node validation using a blockchain, in accordance with some embodiments.

FIGS. 12A-E illustrate further examples of receiver device validation using a blockchain, according to various embodiments. As shown in FIG. 12A, a server 1202 may be associated with a manufacturer of the receiver device 1120 (node F) and the server 1202 may have a high level of trust in the blockchain. In some embodiments, the server 1202 may update the blockchain (e.g., blockchain 1204) to record information regarding the receiver device 1120 as part of a sales transaction. For example, the server 1202 may send a blockchain update that may record that the receiver device 1120 may have an ID of 1234, is of node type XYZ, and was sold to the ABC domain. In some embodiments, the server 1202 may also digitally sign the update using a private key, allowing one or more validators to verify that the update may have been performed by the server 1202 using a corresponding public key of the server 1202.

Figure 12B:
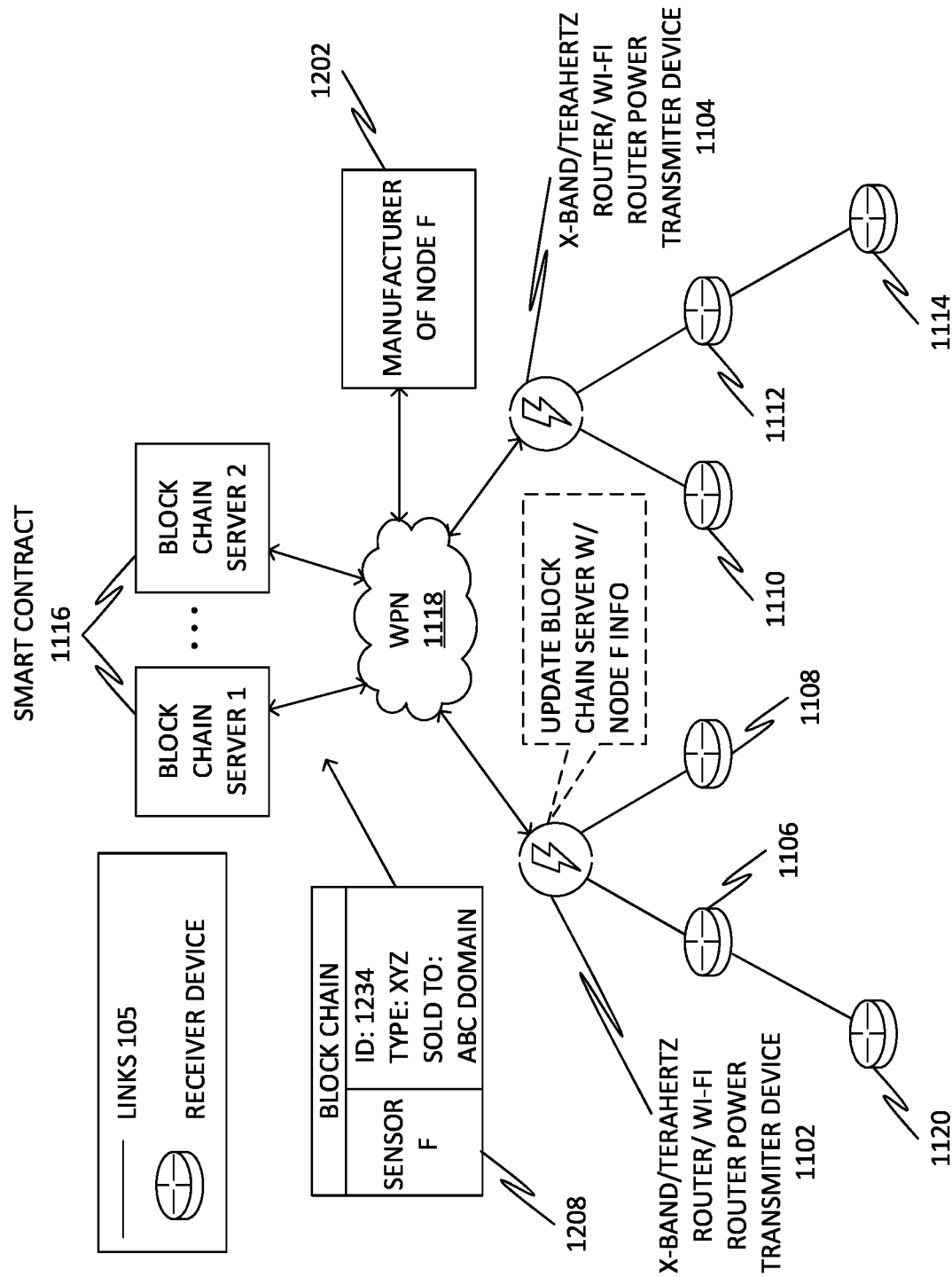

Further, as shown in FIG. 12B, if receiver device 1120 attempts to register with a local domain of the power transmitter device 1102, in a similar manner as illustrated in FIGS. 11A-C. In response to the registration request from the receiver device 1120, the power transmitter 1102 may send a notification 1208 that may include information from the registration request and/or any additional information regarding receiver device 1120, such as the identity of the local domain of transmitter/router 1102. Particularly, the notification 1208 may include information regarding network registration transaction, to update the blockchain. Further, the power transmitter 1102 may also use the information from receiver device 1120 to validate against any existing details that may already be available in the blockchain, such as existing details set by the manufacturer of the receiver device 1120. Once the receiver device 1120 is registered to the local domain of the power transmitter device 1102, the power device 1102 may then update the information pertaining to the receiver device 1120 in the blockchain accordingly.

Figure 12C:
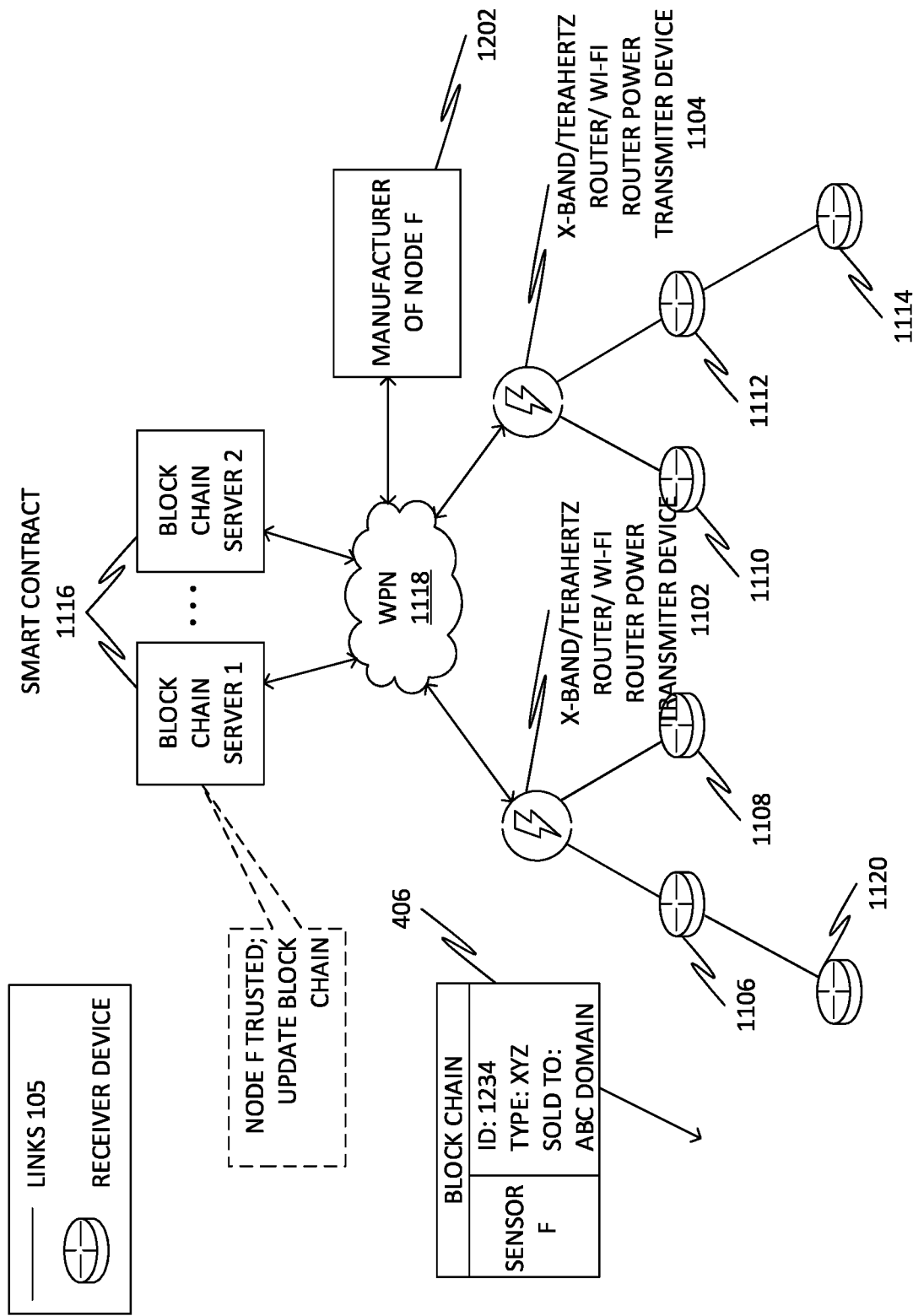
Figure 12D:
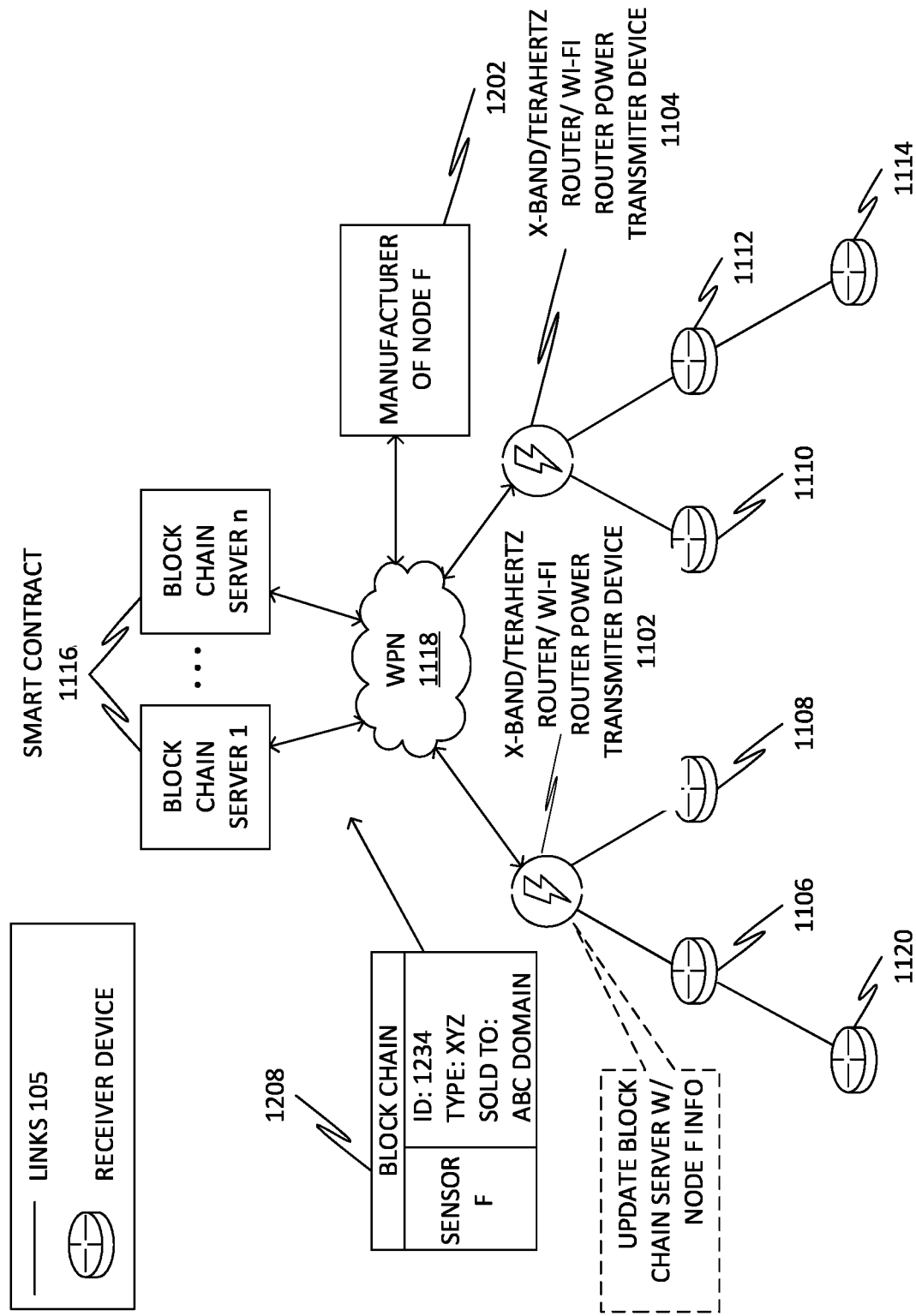
Figure 12E:
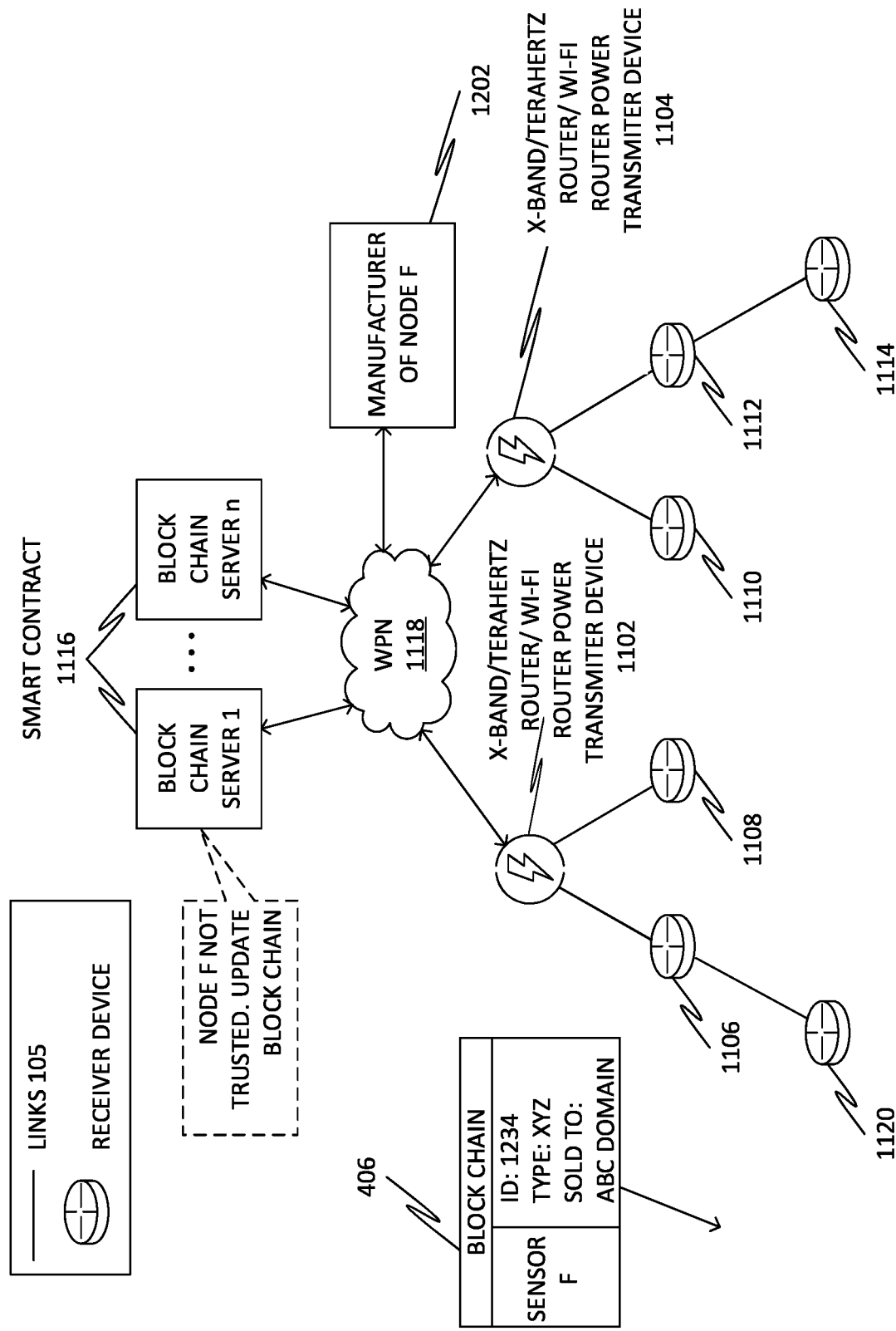

FIG. 12C shows a comparison of the information present in the notification 1208 from the power transmitter device 1102 against the blockchain by a validator to determine a level of trust for receiver device 1120. For instance, if the server 1202 updates the blockchain to indicate that the manufacturer of receiver device 1120 may have sold the receiver device 1120 to the operator of a particular domain. In turn, the validator may compare the reported domain in the notification 1208 against the existing blockchain, to determine whether information about the two domains may match. If a match is found in the compared information, the validator may update the blockchain with the information in the notification 1208 and set a high trust level for node 1120 in the blockchain. Alternatively, as shown in FIG. 12D, if the reported domain in the notification 1208 is different than the existing information stored on the blockchain, the validator may determine that there is a mismatch between the reported domain and the existing information in the blockchain regarding the receiver device 1120. In particular, based on the blockchain, the validator may determine that the receiver device 1120 may be attempting to register with a domain that may differ from the domain previously reported by the manufacturer of the receiver device 1120 in the blockchain. In turn, the validator may update the blockchain with the information about receiver device 1120 and also assign a low level of trust to the receiver device 1120 due to the discrepancy. Further, validator devices in the network may leverage the information stored in the blockchain regarding the one or more receiver devices to control and assess the behavior of the one or more receiver devices. For instance, a validator device may prevent a receiver device with a low level of trust from performing certain functions (e.g., communicating with certain devices, etc.). In one embodiment, a device that receives a request from a particular receiver device may make use of the blockchain to authenticate the requesting receiver device. Based on the results of the authentication, the device may control how the request may be processed. In further cases, the blockchain may carry behavioral information regarding a particular receiver device, such as the location profile of the one or more receiver devices or other observations regarding the one or more receiver devices. In some embodiments, devices in the network may then use the behavioral information to assess whether the current behavior of the one or more receiver devices may be anomalous or otherwise unexpected.

Figure 13A:
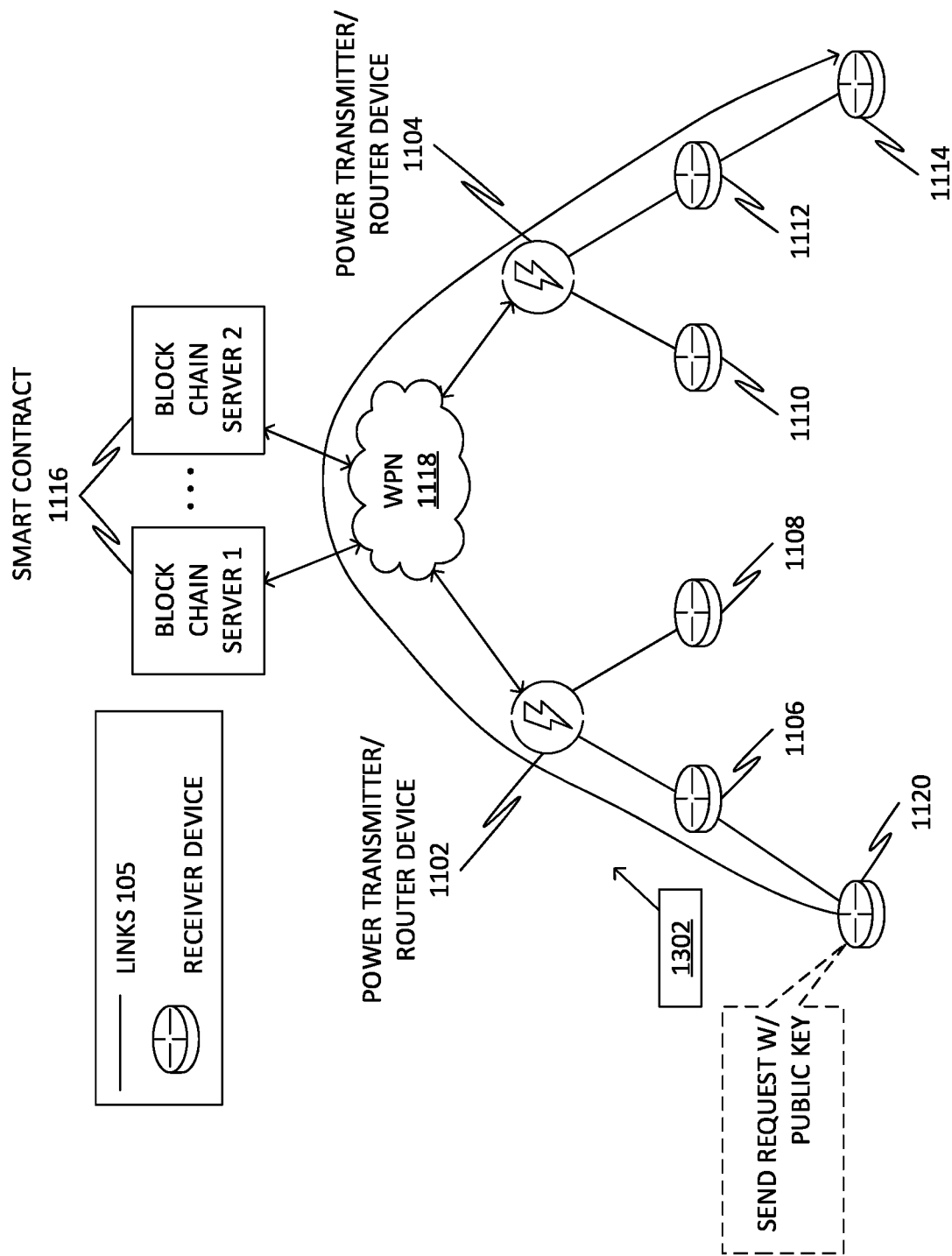
FIGS. 13A-B illustrate examples of a power transmitter device node using blockchain to authenticate, identify, and verify a unique paring request, in accordance with some embodiments.
Figure 13B:
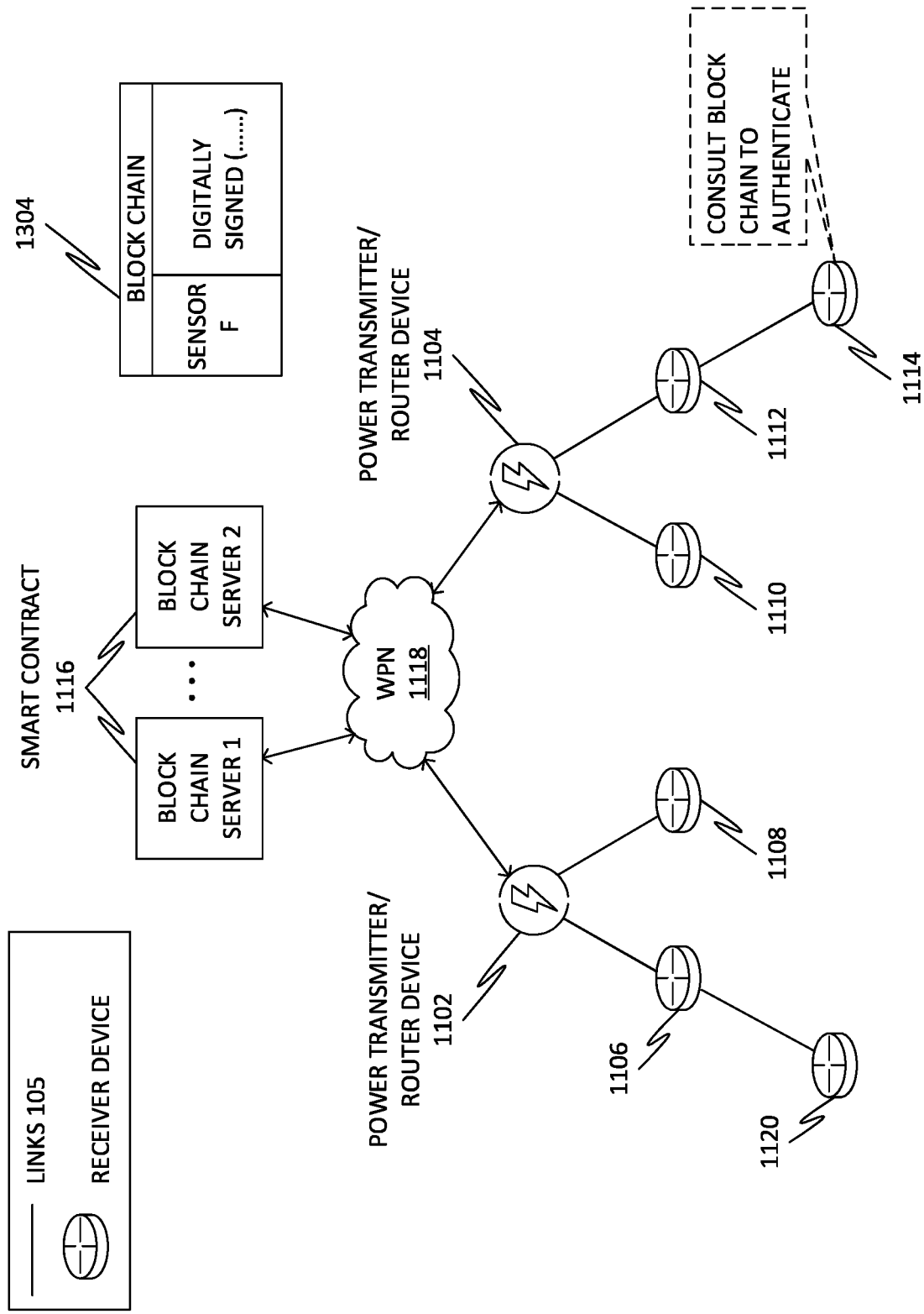

FIGS. 13A-B illustrate examples of a device using a blockchain to authenticate a request, according to various embodiments. As shown in FIG. 13A, if the receiver device 1120 registers with a local network associated with power transmitter device, the receiver device 1120 may transmit one or more requests or messages (e.g., reporting sensor data, etc.) to one or more receiver devices either in the same local network or in a remote network. For instance, if receiver device 1120 sends a request 1302 to receiver device 1114 in the remote network associated with power transmitter device, as part of the request 1302, the receiver device 1120 may also send or otherwise publish a public key. For example, receiver device 1114 may challenge receiver device 1120 the public key of receiver device 1120, which the receiver device 1120 may send through a corresponding application program interface (API)-based response.

As shown in FIG. 13B, the receiver device 1114 may use the public key from the receiver device 1120 to decipher the information in the blockchain regarding the receiver device 1120. For instance, the receiver device 1114 may validate and confirm the identity of the receiver device 1120 by using the public key to decipher the digitally signed data regarding the receiver device 1120 in blockchain 1304. If the receiver device 1114 is unable to do so, the receiver device 1114 may take any number of remediation measures, such as dropping the request 1302, sending a security alert to a supervisory device, etc. Conversely, if the receiver device 1114 is able to authenticate the identity of the receiver device 1120, the receiver device 1114 may authorize the data session with the receiver device 1120. In some embodiments, the receiver device 1114 may further assess the trust level of the receiver device 1120 in the blockchain and apply a lower weight to any data from the receiver device 1120.

Figure 14A:
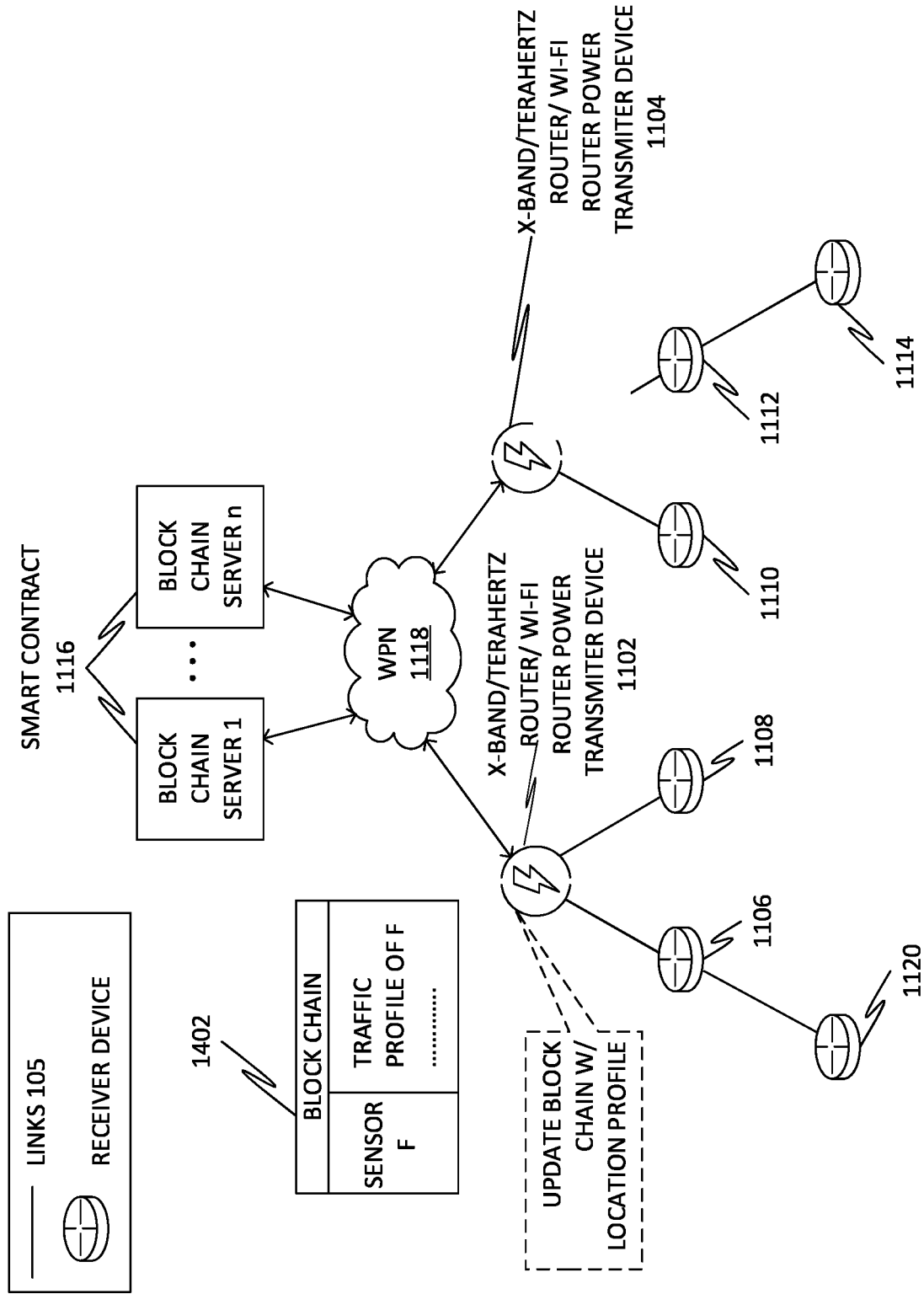
FIGS. 14A-C illustrate examples of a power transmitter device node and receiver node using a bock chain to authenticate to detect a unique paring request for power transmission, in accordance with some embodiments.
Figure 14B:
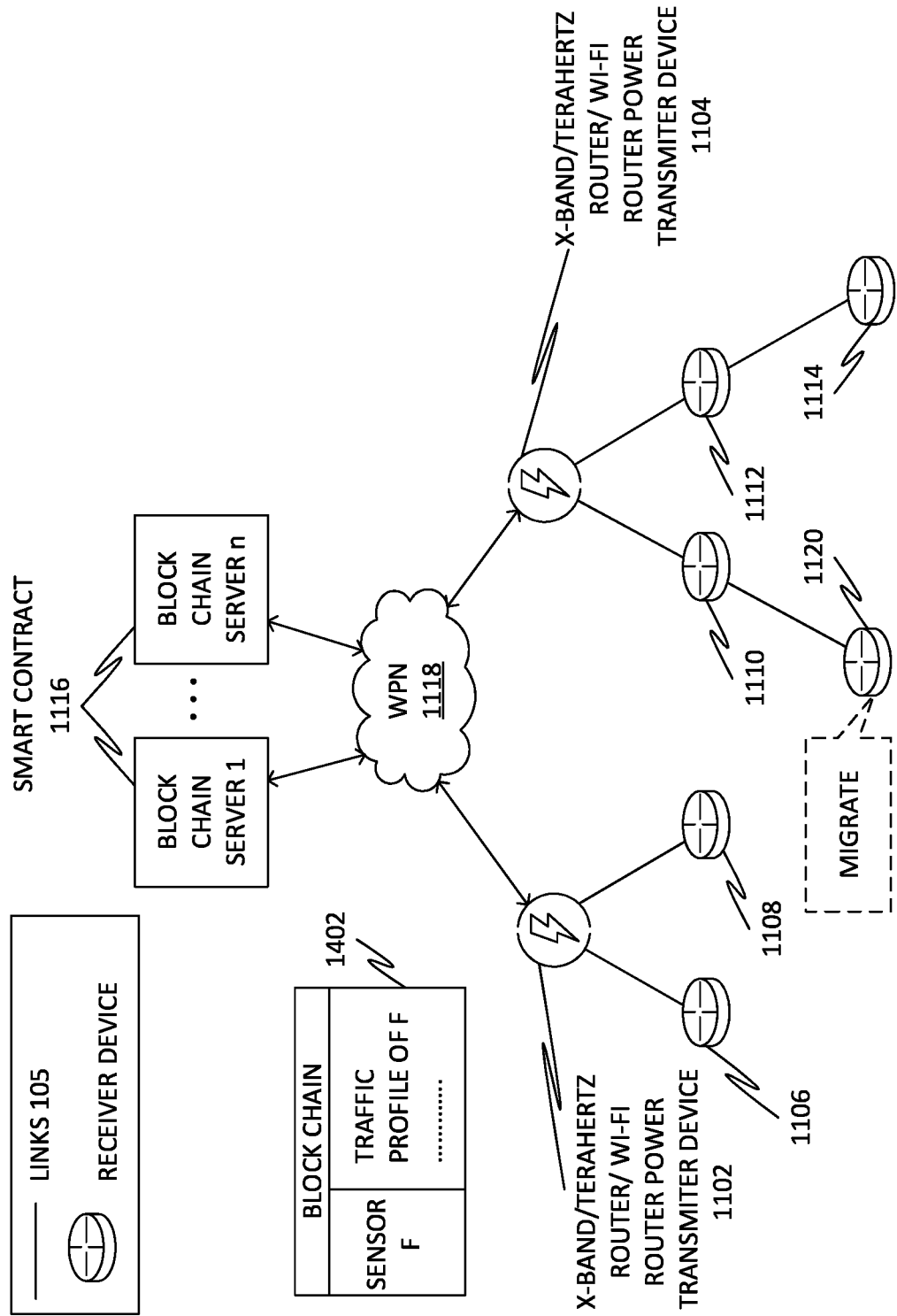
Figure 14C:
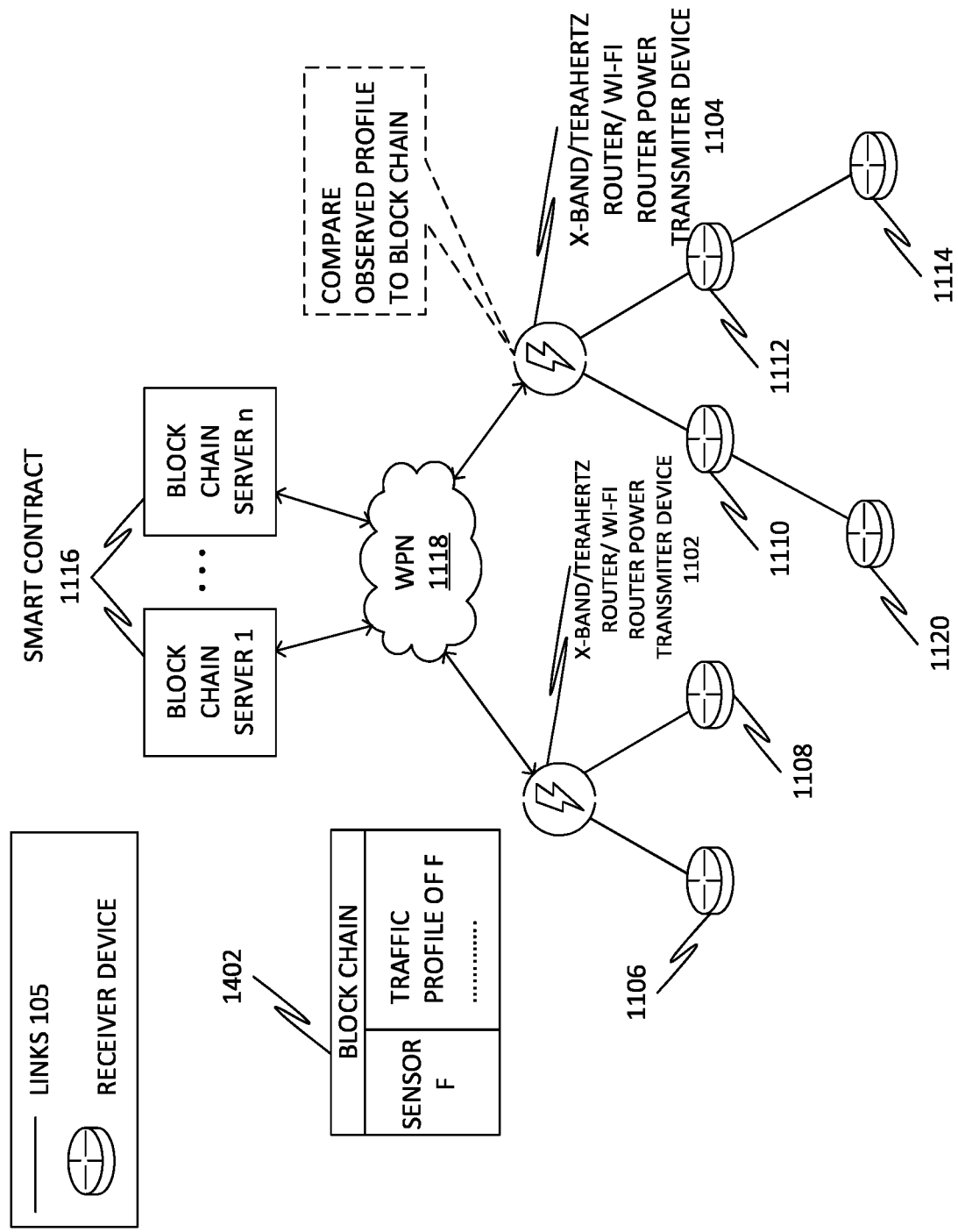

FIGS. 14A-C illustrate examples of a device using a blockchain for authentication, identification, and verification, according to various embodiments. As shown in FIG. 14A, the receiver device 1120 may be registered to a local network of power router device 1102. In some embodiments, the power transmitter device 1102 or another device in the local network may occasionally update the blockchain to indicate the observed behavior of the receiver device 1120. For example, the power transmitter 1102 may monitor the location profile of the receiver device 1120 (e.g., if the receiver device 1120 sends data, the size of the sent data, the destination of the sent data, etc.). In turn, the power transmitter 1102 may initiate a blockchain update 1402 that may include the observed location profile of the receiver device 1120.

Further, as shown in FIG. 14B, if the receiver device 1120 later migrates to another local network, for example, if the receiver device 1120 is a mobile or wearable device, the receiver device 1120 may move away from the local network of the power transmitter device 1102 and into proximity of a local network of the power transmitter device 1104. In such a case, the receiver device 1120 may attempt to register with the local network of the power transmitter device 1104. As a part of this migration, one or more connected devices in the local network of power transmitter device F may use the blockchain to ensure that the receiver device attempting to register with the local domain may indeed be the receiver device 1120 which may previously have been registered in the local domain of the power transmitter device 1102 (e.g., by deciphering digitally signed information in the blockchain using the public key of the receiver device 1120, and so on etc.). In some embodiments, the power transmitter device 1104 may use any behavioral information in the blockchain regarding the receiver device 1120, to determine whether an anomalous condition exists. For example, after the receiver device 1120 is registered to the local network of the power transmitter device 1104, the power transmitter device 2 may observe the location profile of the receiver device 1120. In turn, the power transmitter device 1104 may compare the observed location profile to that may have been previously recorded in the blockchain by the power transmitter device 1102. If a discrepancy is found in the location profiles, the power transmitter device 1104 may determine that an anomaly exists and take any number of remediation measures (e.g., blocking location, sending alerts, etc.). For example, if the receiver device 1120 is a sensor that sends sensory data every hour to a particular service. If the receiver device 1120 suddenly stops sending the sensor data on time, or sends the sensory data to a different service, the power transmitter device 1104 may determine that the receiver device 1120 may be behaving abnormally and take corrective measures based on the location profile in the blockchain.

Figure 15:
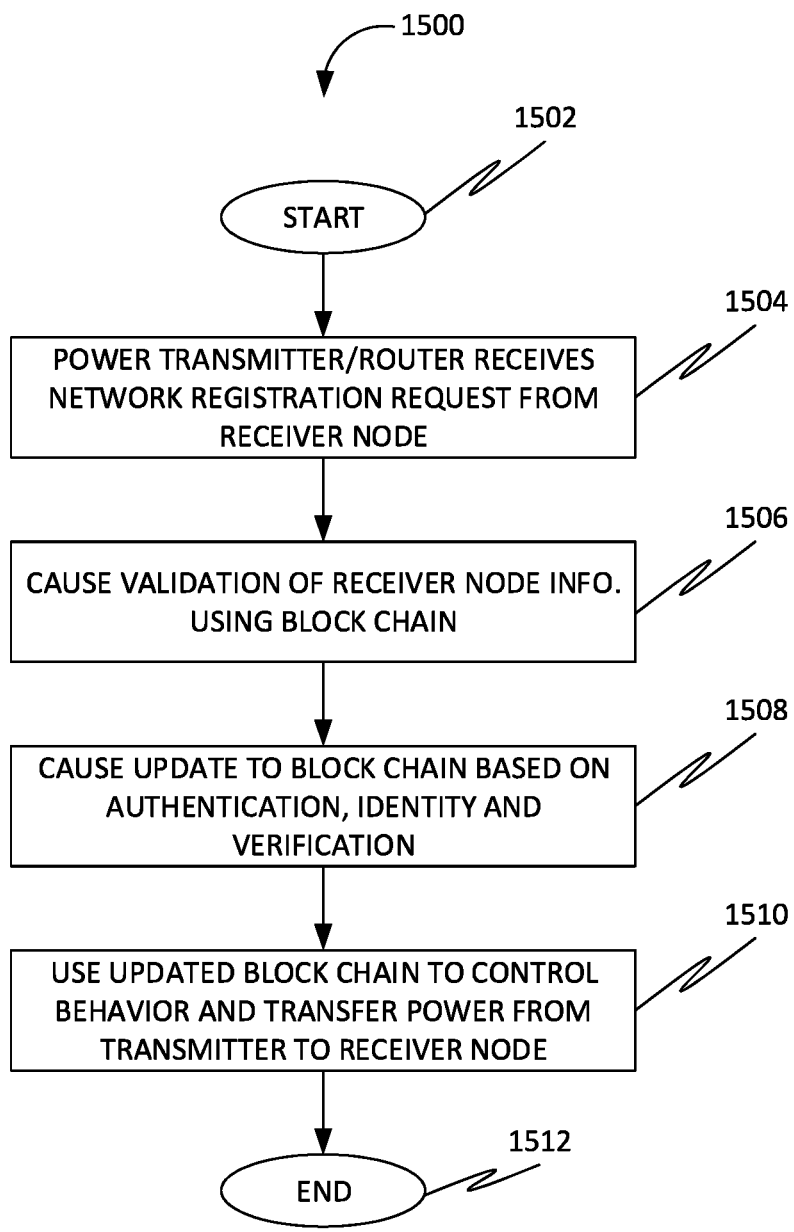
FIG. 15 is a flowchart of a method of wireless charging using blockchain in a network, in accordance with some embodiments.

FIG. 15 is a flowchart of a method 1500 of wireless charging using blockchain in a network, in accordance with some embodiments. In some embodiments, a specialized computing device may perform the method 1500 by executing stored instructions. For example, a power transmitter may perform the method 1500 by executing stored instructions. The method 1500 may start at step 1502, and may continue to step 1504, where, as described in greater detail in conjunction with FIGs. above, a power transmitter device may receive a network registration request from a particular receiver device. For example, a sensor, actuator, or an IoT node, etc., may attempt to register with a local network of the power transmitter device. In various embodiments, the registration request may include information about the particular receiver device such as the type of the receiver device (e.g., type of sensor, etc.), a group identifier, a unique receiver device identifier, an indication of the network to which the receiver device requests registration, or any other information about the particular receiver device. In one embodiment, the receiver device may also apply a digital signature to the request, allowing the device or any other interested device to decipher the contents of the request using the corresponding public key of the receiver device.

At step 1506, as detailed above, the power transmitter device may cause the performance of a validation of the information about the receiver device using a blockchain. In various embodiments, the blockchain may include receiver device information regarding the particular receiver device and any number of other receiver devices. For example, in some cases, the manufacturer of the particular receiver device may create an initial entry in the blockchain that includes details about the particular receiver device. In turn, validation of the receiver device's information may entail comparing the information from the registration request to any existing information about the receiver device in the blockchain. In some embodiments, the power transmitter device itself may perform the validation. In other embodiments, the power transmitter device may cause another validation device to perform the validation, such as a blockchain server, a devoted validation device, etc.

At step 1508, the power transmitter device may cause an update to the blockchain based on the validation in step 1506 and the information about the receiver device received in step 1504. For example, if the power transmitter device a transmitter/router, the router may cause the blockchain to be updated to reflect that the particular receiver device is attached to the network of the router. In some cases, a level of trust for the particular receiver device may be included in the update. For example, if certain information about the receiver device does not match that in the blockchain, the update to the blockchain may indicate a low level of trust for the receiver device.

At step 1510, as detailed above, the power transmitter device may use the updated blockchain to control the behavior of the particular receiver device and one or more other receiver devices. Notably, since the blockchain includes identification information for the particular receiver device and potentially additional metadata regarding the receiver device (e.g., the receiver device's location profile, etc.), the power transmitter device may use the identification and/or additional metadata to control how one or more receiver devices may operate in the network. In some cases, the power transmitter device may use the blockchain to prevent a receiver device from migrating to its local network. In another embodiment, the power transmitter device may limit or restrict traffic flows of the receiver device based on the blockchain. In a further embodiment, the power transmitter device may use metadata about the receiver device in the blockchain to detect anomalous conditions. The method 1500 may then end at step 1512.

It should be noted that while certain steps within the method 1500 may be optional as described above, the steps shown in FIG. 15 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, leverage blockchain to update node identity information, as well as potentially other metadata about a node. In some aspect, a power transmitter/router node may act as a proxy to update the blockchain information on behalf of the node, which allows low-power devices to conserve resources. In another aspect, a validator may use the existing information in the blockchain about a particular node to validate any new information about the node and update the blockchain accordingly. Other nodes in the network can also leverage the blockchain information to facilitate movement of the node across local networks, confirming the identity of the node, performing anomaly detection, etc.

While there have been shown and described illustrative embodiments that provide for the use of a blockchain to convey device information, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of shared-media networks and/or protocols (e.g., wireless). In addition, while certain functions are depicted as performed by certain devices, other embodiments provide for these functions to be distributed as desired across one or more devices.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

Although the invention has been explained in relation to its preferred embodiment, it is to be understood that many other possible modifications and variations can be made without departing from the spirit and scope of the invention.

What is claimed is:

1. A receiver device for facilitating wireless power reception, the receiver device comprising:
   a receiver transceiver configured for wirelessly communicating with at least one transmitter device, wherein the receiver transceiver is configured for:
     receiving at least one transmitter characteristic data from the at least one transmitter device;
     transmitting at least one receiver characteristic data to the at least one transmitter device, wherein the at least one transmitter device is configured for controlling transmission of wireless power based on the at least one receiver characteristic data; and
     receiving wireless power transmission from the at least one transmitter device;
     converting the wireless power transmission into electrical energy;
   a receiver processing device communicatively coupled to the receiver transceiver, wherein the receiver processing device is configured for:
     analyzing the at least one transmitter characteristic data; and
     determining capability of the at least one transmitter device for transmitting wireless power receivable by the receiver device based on the analyzing;
   a receiver storage device configured for storing the at least one receiver characteristic data; and
   a power output port communicatively coupled with the receiver transceiver, wherein the power output port is configured to be interfaced with at least one power input port of at least one electronic device, wherein the power output port is configured for supplying the electrical energy to the at least one electronic device;
   wherein the receiver transceiver is further configured for:
     transmitting a registration request to the at least one transmitter device, wherein the registration request comprises a unique receiver device identifier, wherein the at least one transmitter device is configured for accessing a distributed block-chain associated with wireless power transfer, wherein the at least one transmitter device is further configured for:
       analyzing the registration request; and
       updating the distributed block-chain based on the analyzing of the registration request; and
     transmitting a registration response to the receiver device, wherein the receiver transceiver is configured for receiving the registration response;
   wherein the receiver device is associated with a domain, wherein the at least one transmitter device is further configured for comparing a reported domain of the receiver device in the registration request with a stored domain of the receiver device stored in the distributed block-chain, wherein the transmitting of the registration response is based on the comparing.

2. The receiver device of claim 1, wherein the receiver characteristic data comprises receiver authentication data, wherein the at least one transmitter device is configured for authenticating the receiver device for wireless power transfer based on the receiver authentication data.

3. The receiver device of claim 1, wherein the at least one transmitter characteristic comprises transmitter authentication data, wherein the receiver processing device is configured for authenticating the at least one transmitter device based on the transmitter authenticating data, wherein the receiving of the wireless power from the at least one transmitter device is based on the authenticating of the at least one transmitter device.

4. The receiver device of claim 1 further comprising a microphone communicatively coupled to the receiver processing device, wherein the microphone is configured for detecting a voice command, wherein the receiver processing device is further configured for:
   analyzing the voice command; and
   initiating the wireless communicating of the receiver device with the at least one transmitter device based on the analyzing of the voice command.

5. The receiver device of claim 1, wherein the wireless power transmission comprises terahertz radiation.

6. The receiver device of claim 1, wherein the receiver transceiver is further configured for:
   pairing with at least one transmitter transceiver comprised in the at least one transmitter device based on at least one of the at least one transmitter characteristic data and the at least one receiver characteristic data; and
   establishing a wireless power transfer connection based on the pairing, wherein the wireless power transmission from the at least one transmitter device is based on the wireless power transfer connection.

7. The receiver device of claim 1, wherein the at least one receiver characteristic data comprises a receiver device type of the receiver device, at least one distance between the receiver device and the at least one transmitter device and an amount of power requested by the receiver device, wherein the at least one transmitter device is configured for controlling the wireless power transmission based on at least one of the at least one distance and the receiver device type.

8. The receiver device of claim 7, wherein the at least one transmitter characteristic data comprises a transmitter device type of the at least one transmitter device, a transmission power level associated with the at least one transmitter device, wherein the receiver processing device is further configured for determining the at least one distance based on analyzing each of the transmitter device type of the at least one transmitter device, the transmission power level and at least one received power level corresponding to the wireless power transmission received from the at least one transmitter device.

9. The receiver device of claim 1, wherein the at least one receiver characteristic data comprises a receiver device type, wherein the at least one transmitter device is configured for determining at least one distance between the receiver device and the at least one transmitter device based on a measurement of loading created on at least one antenna corresponding to the at least one transmitter device due to the receiving of the wireless power transmission by the receiver device from the at least one transmitter device.

10. The receiver device of claim 1, wherein the receiver transceiver comprises a first receiver transceiver configured for communicating over a first frequency band and a second receiver transceiver configured for communicating over a second frequency band, wherein the first receiver transceiver is configured for receiving the at least one transmitter characteristic data and transmitting the at least one receiver characteristic data, wherein the second receiver transceiver is configured for receiving the wireless power transmission from the at least one transmitter device, wherein the first frequency band is characterized by frequencies lower than terahertz frequencies, wherein the second frequency band is characterized by terahertz frequencies.

11. The receiver device of claim 1, wherein the receiver transceiver is further configured for transmitting wireless power transmission to the at least one transmitter device, wherein the receiver processing device is further configured for:
    analyzing the at least one transmitter characteristic data; and
    determining capability of the at least one transmitter device for receiving wireless power transmittable by the receiver device based on the analyzing of the at least one transmitter characteristic data.

12. The receiver device of claim 1 further comprising at least one sensor configured for sensing at least one variable associated with wireless power transfer between the at least one transmitter device and the receiver device, wherein the receiver processing device is further configured for:
    analyzing the at least one variable; and
    generating a notification based on the analyzing of the at least one variable, wherein the receiver transceiver is further configured for transmitting the notification to a user device associated with the receiver device.

13. The receiver device of claim 12, wherein the receiver processing device is further configured for determining an abnormal state of wireless power transfer based on the analyzing of the at least one variable, wherein the receiver device further comprises an input device configured for receiving an input from a user of the receiver device, wherein the wireless power reception is based on the input.

14. The receiver device of claim 1, wherein the at least one receiver characteristic data comprises a wireless power transfer request comprising the unique receiver device identifier, wherein the at least one transmitter device is configured for:
    accessing the distributed block-chain based on the wireless power transfer request;
    authenticating the receiver device based on a result of the accessing; and
    granting the wireless power transfer request based on the authenticating, wherein the wireless power transmission is based on the granting.

15. The receiver device of claim 1, wherein the distributed block-chain comprises a trust level associated with the receiver device, wherein the authenticating of the receiver device is based on the trust level.

16. The receiver device of claim 1 further comprising at least one sensor configured for sensing at least one variable associated with wireless power transfer between the at least one transmitter device and the receiver device, wherein the receiver device is further configured for storing the at least one variable in the distributed block-chain, wherein the at least one transmitter device is further configured for:
    retrieving the at least one variable from the distributed block-chain;
    analyzing the at least one variable; and
    determining a behavior of the receiver device based on the analyzing of the at least one variable.

17. The receiver device of claim 16, wherein the at least one transmitter device is further configured for:
    generating a trust level associated with the receiver device based on the behavior; and
    updating the distributed block-chain with the trust level associated with the receiver device.

18. The receiver device of claim 16, wherein the at least one sensor comprises a receiver location sensor configured to determine a geographical location of the receiver device, wherein, the registration request comprises the geographical location, wherein the at least one transmitter device is further configured for updating the distributed block-chain with the geographical location of the receiver device.

* * * * *